United States Patent
Katoh et al.

(10) Patent No.: US 9,682,446 B2
(45) Date of Patent: Jun. 20, 2017

(54) FLUX-CORED WIRE FOR DIFFERENT-MATERIAL BONDING AND METHOD OF BONDING DIFFERENT MATERIALS

(75) Inventors: Jun Katoh, Kobe (JP); Mikako Takeda, Kobe (JP); Seiji Sasabe, Fujisawa (JP); Katsushi Matsumoto, Kobe (JP); Hidekazu Ido, Kobe (JP); Tsuyoshi Matsumoto, Fujisawa (JP)

(73) Assignee: Kobe Steel, Ltd., Kobe-shi (JP)

( * ) Notice: Subject to any disclaimer, the term of this patent is extended or adjusted under 35 U.S.C. 154(b) by 2185 days.

(21) Appl. No.: 12/279,470

(22) PCT Filed: Feb. 6, 2007

(86) PCT No.: PCT/JP2007/052041
§ 371 (c)(1),
(2), (4) Date: Aug. 14, 2008

(87) PCT Pub. No.: WO2007/094203
PCT Pub. Date: Aug. 23, 2007

(65) Prior Publication Data
US 2009/0017328 A1    Jan. 15, 2009

(30) Foreign Application Priority Data

Feb. 17, 2006 (JP) .................................. 2006-041135
Apr. 10, 2006 (JP) .................................. 2006-107491
(Continued)

(51) Int. Cl.
*B23K 35/02* (2006.01)
*B23K 9/23* (2006.01)
(Continued)

(52) U.S. Cl.
CPC .......... *B23K 35/0266* (2013.01); *B23K 9/173* (2013.01); *B23K 9/232* (2013.01);
(Continued)

(58) Field of Classification Search
CPC ........ B23K 9/232; B23K 9/173; B23K 26/00; B23K 26/20; B23K 35/0266;
(Continued)

(56) References Cited

U.S. PATENT DOCUMENTS 2,470,763 A * 5/1949 Doyle ........................... 428/385
3,340,104 A * 9/1967 Ballass et al. ................ 148/26
(Continued)

FOREIGN PATENT DOCUMENTS

JP    60 118389    6/1985
JP    61 162295    7/1986
(Continued)

OTHER PUBLICATIONS

Stoehr, R. A. et al., "Gas Metal-Arc Spot Welding Joins Aluminum to Other Metals", Welding Journal, vol. 41, No. 9, pp. 302-308, (1963).
(Continued)

*Primary Examiner* — Dana Ross
*Assistant Examiner* — Lindsey C Staubach
(74) *Attorney, Agent, or Firm* — Oblon, McClelland, Maier & Neustadt, L.L.P.

(57) ABSTRACT

There are provided a flux cored wire for joining dissimilar materials with each other, capable of enhancing a bonding strength upon joining an aluminum-base material with a steel-base material, and excellent in bonding efficiency, a method for joining the dissimilar materials with each other, and a bonded joint obtained by the method. In particular, there is provided a method for joining dissimilar materials with each other, in the case of melt weld-bonding of high-
(Continued)

strength dissimilar materials with each other, that is, the high-strength steel member with the high-strength 6000 series aluminum alloy member and in the case of the steel member being a galvanized steel member. In one mode, use is made of a flux cored wire wherein the interior of an aluminum alloy envelope is filled up with a flux, the flux has fluoride composition containing a given amount of $AlF_3$ without containing chloride, and the aluminum alloy of the envelope contains Si in a range of 1 to 13 mass %. If such a flux cored wire is use, it is possible to obtain a high bonding strength in the case of melt weld-bonding of high-strength dissimilar materials with each other, that is, the high-strength steel member with the high-strength 6000 series aluminum alloy member.

14 Claims, 3 Drawing Sheets

(30) Foreign Application Priority Data

Sep. 14, 2006 (JP) ................................. 2006-249679
Nov. 16, 2006 (JP) ................................. 2006-310535

(51) Int. Cl.
*B23K 35/30* (2006.01)
*B23K 35/36* (2006.01)
*B23K 9/173* (2006.01)
*B23K 35/362* (2006.01)
*B23K 35/40* (2006.01)
*B23K 101/18* (2006.01)
*B23K 103/20* (2006.01)

(52) U.S. Cl.
CPC .......... *B23K 35/362* (2013.01); *B23K 35/406* (2013.01); *B23K 2201/18* (2013.01); *B23K 2203/20* (2013.01); *Y10T 428/12757* (2015.01)

(58) Field of Classification Search
CPC ................ B23K 35/362; B23K 35/406; B23K 2201/18; B23K 2203/20
USPC ........ 219/145.22, 146.1, 146.24, 74, 121.62, 219/121.61, 121.64, 121.63, 121.6, 137 R, 219/137 WM, 146.3, 146.52; 228/178; 148/24
See application file for complete search history.

(56) References Cited

U.S. PATENT DOCUMENTS

| | | | | |
|---|---|---|---|---|
| 3,805,016 A | * | 4/1974 | Soejima et al. | 219/146.52 |
| 3,911,244 A | * | 10/1975 | Nakamura et al. | 219/146.3 |
| 3,935,414 A | * | 1/1976 | Ballass et al. | 219/61 |
| 3,935,421 A | * | 1/1976 | Ballass et al. | 219/146.3 |
| 3,941,588 A | * | 3/1976 | Dremann | 75/253 |
| 3,951,328 A | * | 4/1976 | Wallace et al. | 228/207 |
| 3,971,501 A | * | 7/1976 | Cooke | 228/248.1 |
| 4,436,563 A | * | 3/1984 | Tanaka et al. | 148/26 |
| 4,475,960 A | * | 10/1984 | Yamawaki et al. | 148/26 |
| 4,556,165 A | * | 12/1985 | Yamawaki et al. | 228/223 |
| 4,808,374 A | * | 2/1989 | Awano et al. | 420/537 |
| 4,906,307 A | * | 3/1990 | Fujiyoshi | 148/26 |
| 5,099,103 A | * | 3/1992 | Yamada et al. | 219/145.22 |
| 5,100,486 A | * | 3/1992 | Krikorian et al. | 148/248 |
| 5,124,530 A | * | 6/1992 | O'Donnell et al. | 219/146.23 |
| 5,171,377 A | * | 12/1992 | Shimizu et al. | 148/23 |
| 5,418,072 A | * | 5/1995 | Baldantoni et al. | 428/558 |
| 5,547,517 A | * | 8/1996 | Iwai | 148/24 |
| 5,781,846 A | * | 7/1998 | Jossick | 419/66 |
| 5,802,716 A | * | 9/1998 | Nishimura et al. | 29/888.06 |
| 5,854,463 A | * | 12/1998 | Yamashita et al. | 219/145.22 |
| 6,113,667 A | * | 9/2000 | Hyogo et al. | 75/255 |
| 6,164,517 A | * | 12/2000 | Kim | 228/56.3 |
| 6,203,628 B1 | * | 3/2001 | Katoh et al. | 148/23 |
| 6,267,922 B1 | * | 7/2001 | Bull et al. | 420/534 |
| 6,409,074 B1 | * | 6/2002 | Katoh et al. | 228/223 |
| 6,440,583 B1 | * | 8/2002 | Ueno et al. | 428/654 |
| 6,497,770 B2 | * | 12/2002 | Watsuji et al. | 148/23 |
| 6,548,191 B2 | * | 4/2003 | Osame et al. | 428/654 |
| 6,753,094 B1 | * | 6/2004 | Wittebrood | 428/626 |
| 6,933,468 B2 | * | 8/2005 | Keegan et al. | 219/145.22 |
| 7,239,820 B2 | * | 7/2007 | Donaldson | 399/49 |
| 7,850,059 B2 | * | 12/2010 | Kobayashi et al. | 228/178 |
| 2002/0005230 A1 | * | 1/2002 | Watsuji et al. | 148/23 |
| 2002/0012810 A1 | * | 1/2002 | Osame et al. | 428/650 |
| 2005/0023258 A1 | * | 2/2005 | Tsushima et al. | 219/121.64 |
| 2006/0243359 A1 | * | 11/2006 | Sano et al. | 148/689 |

FOREIGN PATENT DOCUMENTS

| | | |
|---|---|---|
| JP | 62 207598 | 9/1987 |
| JP | 05 008056 | 1/1993 |
| JP | 06 039558 | 2/1994 |
| JP | 06 063762 | 3/1994 |
| JP | 06 198458 | 7/1994 |
| JP | 06-304780 A * | 11/1994 |
| JP | 07 148571 | 6/1995 |
| JP | 07 314176 | 12/1995 |
| JP | 08 141755 | 6/1996 |
| JP | 09 155548 | 6/1997 |
| JP | 10 034377 | 2/1998 |
| JP | 10 185040 | 7/1998 |
| JP | 10 314933 | 12/1998 |
| JP | 11 197846 | 7/1999 |
| JP | 2000 094162 | 4/2000 |
| JP | 2003 033865 | 2/2003 |
| JP | 2003 048077 | 2/2003 |
| JP | 2003 211270 | 7/2003 |
| JP | 2004 210013 | 7/2004 |
| JP | 2004 210023 | 7/2004 |
| JP | 2004 223548 | 8/2004 |
| JP | 2004 351507 | 12/2004 |

OTHER PUBLICATIONS

Sugiyama, Yoshihiko, "MIG Spot Welding Aluminium to Dissimilar Metals", Light Metal Welding, vol. 16, No. 12, pp. 8-16, 1978, (with partial English translation).

Matsumoto, Katsushi et al., "Influence of forms of welded joint and welding condition on the strength of aluminum/steel joint by MIG welding—Application of Al based wire to MIG welding-", Japan Welding Society (JWS), vol. 75, pp. 260-261, 2004, (with English translation).

U.S. Appl. No. 13/388,177, filed Jan. 31, 2012, Matsumoto, et al.

* cited by examiner

EVALUATION:× EVALUATION:○

FLUX-CORED WIRE FOR DIFFERENT-MATERIAL BONDING AND METHOD OF BONDING DIFFERENT MATERIALS

TECHNICAL FIELD

The invention relates to a flux cored wire (FCW: Flux Cored Wire) for joining dissimilar materials with each other, that is, a steel-base material and an aluminum-base material with each other, and a method for joining the dissimilar materials with each other. A technology according to the invention is suitably applicable to automobiles, railway vehicles, and so forth, in the transportation field, machine components, construction members such as building structures, and so forth. The technology is required in the assembling process for automobile structures.

BACKGROUND ART

In the case of welding, metal members similar in kind are generally joined with each other. However, if welding can be applied to joining of dissimilar metal members such as a steel-base material (hereinafter referred to merely as a steel member) and an aluminum-base material (generic term used for pure aluminum and aluminum alloy, and hereinafter referred to merely as an aluminum member) with each other (an aggregate of the dissimilar materials joined), this will enable the aggregate of the dissimilar materials joined to be used as a structural member of the automobile, and so forth, thereby significantly contributing to reduction in weight of the automobile, and so forth.

However, in the case of joining the steel member with the aluminum alloy member by welding, a brittle Fe—Al intermetallic compound is prone to be formed at a joint, so that it has been very difficult to obtain a reliable joint high in strength (bonding strength). Accordingly, to effect joining at those aggregates of the dissimilar materials joined (dissimilar metal members joined), joining by use of bolts, rivets, and so forth has been adopted in the past, however, a bonded joint has a problem with its reliability, air-tightness, cost, and so forth.

Meanwhile, it has been intended to enhance strength of the aluminum member as well as the steel member in order to achieve reduction in weight of automobile components such as an automobile body, and so forth, so that there has been a tendency to use a high-strength steel (high tensile steel) member for the steel member, and to use a high-strength A6000 series aluminum alloy member with less alloying elements, and excellent in recyclability among aluminum alloy members.

In consequence, in the case of joining dissimilar materials with each other by welding, there has since occurred a change in joining objects, that is, a change from the conventional joining of dissimilar materials low in strength with each other, such as joining of mild steel with pure aluminum or a A5000 series aluminum alloy, by welding, to joining of dissimilar materials high in strength with each other, such as joining of the high-strength steel with the A6000 series aluminum alloy member by welding. With the joining of those dissimilar materials high in strength with each other, conditions under which the brittle Fe—Al intermetallic compound is generated at a joint will vary on a case-by-case basis. Hence, in order to obtain reliable, and high bonding strength, it becomes necessary to devise new joining conditions in contrast with conditions for the conventional joining of the dissimilar materials low in strength with each other, by welding.

In the case of joining dissimilar materials such as the steel member and the aluminum member with each other, the steel member is high in melting point, and electrical resistance, but low in thermal conductivity, as compared with the aluminum member, so that heat evolution on the steel side of a joint will be greater, thereby causing aluminum lower in melting point to be first fused. Next, the surface of the steel member undergoes fusion, resulting in formation of a brittle intermetallic compound of Fe—Al series on an interface therebetween. As a result, it is not possible to obtain a high bonding strength.

Accordingly, there have since been made many reviews and proposals on a joining method for obtaining the joint of the dissimilar materials such as the steel member and the aluminum member. For example, a method for joining the dissimilar materials together by rolling the same in a vacuum has been proposed (refer to Patent Document 1). There has also been proposed a method for making seam welds by interposing a two-layer cladding material made up of a steel-base material layer and an aluminum alloy layer, prepared beforehand (refer to Patent Document 2). Further, there has been proposed a method for pressure joining at a high temperature (refer to Patent Document 3). Still further, there has been proposed a method for joining by HIP treatment by interposing a Ti alloy placed on respective joint surfaces (refer to Patent Documents 4 and 5). Yet further, there has been proposed a method for friction welding (refer to Patent Document 6). Then, there has been proposed a method whereby resistance welding is carried out by plating the surface of a steel material layer, in contact with aluminum, with an aluminum alloy beforehand, or by interposing the two-layer cladding material made up of the steel-base material layer and the aluminum alloy layer, prepared beforehand (refer to Patent Documents 7, and 8).

Those conventional techniques, however, each have the following problem. For example, the methods for obtaining the joint of the dissimilar materials such as the steel member and the aluminum member, according to Patent Documents 1 to 8, respectively, are in common with each other in that those methods are applicable to joining of members relatively simple in shape, such as flat sheets, or the like, with each other, but are not applicable to joining of members complex in shape with each other because of constraints imposed on the shape thereof. For this reason, those methods each have a narrow range of application, and are inferior in general versatility. Further, those methods each have a problem in that a joint is confined to a relatively small portion of the area of the joint, thereby preventing a continuous joint from being obtained. Still further, because any of those methods will be complicated in process step, it is not possible to ensure stability in quality, thereby causing a problem of an increase in joining cost, and lack of practicality. Yet further, with the existing welding line, it is not possible to carry out any of those methods, and in order to carry out any of those methods, there is the need for adding new facilities to the present facilities, causing another problem of an increase in capital cost.

As one of the background behind the proposals on the various method for joining the steel-base material with the aluminum-base material, described as above, there can be cited a phenomenon that if the steel-base material is joined directly with the aluminum-base material by fusion, a brittle intermetallic compound is generated at the joint, thereby causing the joint prone to cracking. Accordingly, when joining the steel-base material directly with the aluminum-base material, including the case of joining using a welding wire, it becomes extremely important how to prevent as much as possible steel of the steel-base material, and aluminum of the aluminum-base material from being fused to be mixed with each other to thereby secure ductility of fused metal parts, and how to prevent the brittle intermetallic compound from being formed in the vicinity of an interface between the steel-base material, and the aluminum-base material In contrast to the above, there has been proposed a method for line-joining or face-joining the steel material with the aluminum material by arc welding (refer to Non-patent Documents 1, 2, and 3). Further, there has also been proposed a method for joining the steel material directly with the aluminum material by MIG brazing in order to secure a sound bonded joint (refer to Patent Document 9).

With the method for joining the steel material with the aluminum material by arc welding, as described in Non-patent Documents 1, 2, 3, and so forth, holes are provided on the steel material side of a joint beforehand, and a growth direction of an intermetallic compound acting as a factor for blocking securing of strength is controlled by filling up the holes with the aluminum material, thereby attempting to obtain a high bonding strength. However, with those methods as described in Non-patent Documents 1, 2, 3, respectively, cracking is prone to occur to beads in the case of continuous arc welding, so that a welded joint still has a room for improvement in strength. The same applied to Patent Document 9.

Further, there has been proposed a method for brazing at a low temperature so as to prevent a brittle Fe—Al intermetallic compound from being generated at a joint (refer to Patent Documents 10, 11).

Still further, in the case of melt welding for those joints of the dissimilar materials, whereby joining is carried out at a higher temperature, there has been proposed a method for joining an aluminum alloy member with a steel member having a surface with zinc plating applied thereto by pulse MIG welding with the use of a solid wire made of an aluminum alloy with addition of silicon at least in a range of 3 to 15 wt % as a welding wire (refer to Patent Document 12). With this method, upon fusion of the welding wire, silicon is caused to move toward a base metal to permeate the interface of a fusion pond, thereby rising in temperature, whereupon wettability of fused metals is improved to thereby enhance adhesion properties thereof.

Further, it has been proposed to enhance the strength of a welded joint by improving composition of a flux for use in melt-welding of the joint of the dissimilar materials. For example, there has been proposed a method for arc welding of a mild steel with a pure aluminum member, or an A5000 series aluminum alloy member by use of a wire with a flux incorporated therein, formed by coating the flux containing a fluoride (cesium fluoride, aluminum fluoride, potassium fluoride, and aluminum oxide), serving as a core material, with aluminum, or an aluminum alloy (refer to Patent Document 13).

Still further, there has been proposed a method for joining dissimilar materials together, that is, joining a steel member with an aluminum member by any of various welding processes such as magnetic welding, ultrasonic welding, high-frequency welding, spot welding, and so forth, using a fluoride-based mixed flux containing potassium fluoride, aluminum fluoride, and so forth, together with at least one fluoride selected from the group consisting of cesium fluoride, aluminum fluoride, potassium fluoride, and zinc fluoride), in as-coated state (refer to Patent Document 14). With those methods as described, cleaning on the surface of the steel is urged by the agency of the chemical reaction of the flux as above, and the wettability as well as adhesion properties of a molten metal composed of aluminum will be improved, thereby blocking formation of a brittle and thick intermetallic compound.

Yet further, there has also been proposed a method for spot welding of a mild steel with an A6000 series aluminum alloy member by coating the surface of the aluminum alloy member with a fluoride-based flux having the effect of causing reduction of a sturdy oxide film formed on the surface of the aluminum alloy member to be thereby melt and removed from the surface of the aluminum alloy member (refer to Patent Document 15). Furthermore, those fluoride-based fluxes are also used for joining aluminum alloy members with each other by melt welding and so forth (refer to Patent Documents 16, and 17).

Patent Document 1: JP-A No. 2000-94162
Patent Document 2: JP-A No. 11 (1999)-197846
Patent Document 3: JP-A No. 10 (1998)-185040
Patent Document 4: JP-A No. 6 (1994)-198458
Patent Document 5: JP-A No. 5 (1993)-8056
Patent Document 6: JP-A No. 8 (1996)-142755
Patent Document 7: JP-A No. 6 (1994)-39558
Patent Document 8: JP-A No. 6 (1994)-63762
Patent Document 9: JP-A No. 2003-33865
Patent Document 10: JP-A No. 7 (1995)-148571
Patent Document 11: JP-A No. 10 (1998)-314933
Patent Document 12: JP-A No. 2004-223548
Patent Document 13: JP-A No. 2003-211270
Patent Document 14: JP-A No. 2003-48077
Patent Document 15: JP-A No. 2004-351507
Patent Document 16: JP-A No. 2004-210013
Patent Document 17: JP-A No. 2004-210023
Non-patent Document 1: WELDING JOURNAL, (1963), p. 302
Non-patent Document 2: LIGHT METAL WELDING, Vol. 16 (1987) No. 12, p. 8
Non-patent Document 3: National Conference of Japan Association of Welding, Proceedings No. 75 (2004), pp. 260 to 261

DISCLOSURE OF THE INVENTION

Problem to be Solved by the Invention

Taking into consideration the case where the joint of the dissimilar materials (welded joint of the dissimilar materials) formed by weld-bonding the steel member with the aluminum member is put to use as structural members of the automobile, and so forth, the joint needs strength capable of withstanding a load (stress) imposed thereon at the time of automobile collision, and so forth. Those structural members of the automobile include, for example, the bonded joints of the dissimilar materials such as side members made up of the steel members, bumper stay (a bonded member on the rear side of a bumper reinforcement), and so forth. The bonded joints of the dissimilar materials according to those conventional techniques described in the foregoing, respectively, however, are found lacking in bonding strength if such application as described is assumed, and still have a room for improvement.

Further, as a more important problem, there exists a problem that zinc plating (layer) for general use on the steel member side of the aggregate of the dissimilar materials joined interferes with weldability, thereby lowering bonding strength. In particular, with the aggregate of the dissimilar materials joined, where the steel member is joined with the aluminum member, the steel member being coated with hot dip zinc plating or hot dip alloyed zinc plating, relatively large in plating thickness, will be inferior in weldability to a bare steel member, thereby exhibiting pronounced deterioration in the bonding strength thereof.

This is because in the case of joining together dissimilar materials, that is, a galvanized steel sheet (zinc plated steel member), and an aluminum member, there is inevitably generated a brittle Zn—Fe based intermetallic compound layer attributable to zing plating besides the brittle intermetallic compound generated at the joint of the dissimilar materials. Since the Zn—Fe based intermetallic compound layer is brittle, the same becomes a starting point of rupture, thereby markedly deteriorating bonding strength.

Further, with the spot welding, a joint is confined to a relatively small portion of the area of the joint, so that it is not possible to obtain a continuous joint. The spot welding is therefore efficient, and suitable for use in joining panels with each other, but is unsuitable for line welding, such as fillet welding, butt welding, and so forth, required of bimetallic joining for the structural members of the automobile.

In the case of the brazing at low temperatures, as described in Patent Documents 10, and 11, respectively, brazing by use of a solder of aluminum base, or by use of flux and the solder of aluminum base has been carried out. However, in the case of the brazing at low temperatures, a joining temperature range for members to be joined together needs be strictly controlled so as to be not lower than the melting temperature of the solder, and not higher than the melting temperature of the members to be joined together. Accordingly, in order to apply the brazing at low temperatures to joining of large sized members such as an automobile body, and so forth, there is the need for a large furnace where temperature control can be executed with precision. Further, the brazing at low temperatures cannot be applied to the joining of the large sized members such as the automobile body to require design freedom of the shape of a joint, and so forth because it takes long time to implement joining by so doing.

With the method for carrying out the MIG welding using the solid wire made of the aluminum alloy with addition of silicon, as a welding wire, as described in Patent Document 12, there exist a problem in that not only an expensive power supply is required to effect high precision control of heat input conditions and so forth, but also the shape of a joint is strictly limited. For this reason, this method is not applicable to, for example, the large sized members such as the automobile body, and so forth either.

In the case of the techniques whereby arc welding, and so forth, using the fluoride-based mixed flux in as-coated state, are executed to cope with the problems described in the foregoing, effects of improvement in arc-weldability, by the agency of the flux, can be expected. However, the techniques described in Patent Documents 13, 14, respectively, were found to have a problem in that upon actual execution of the arc welding, the fluoride-based mixed flux itself coated to a weld zone was spattered in a large amount even within a range of normal work conditions, thereby rendering it difficult to carry out a welding work itself. There was also a problem that filler metal was found spread due to excessive improvement in wettability thereof, thereby causing incomplete formation of a bead.

The fluoride-based mixed flux composed of a mixture containing aluminum fluoride, and potassium fluoride, originally having a melting point lower than that of aluminum, and cesium fluoride low in melting point, added to the mixture, will have a melting point thereof further lowered. Accordingly, there arises a problem in that a large amount of the flux undergoes evaporation at the time of welding, so that not only deterioration of workability results due to evolution of fume, and spattering, and so forth, but also a high bonding strength cannot be obtained because weld metal composed of aluminum is excessively spread, thereby preventing formation of a sound bead.

It is possible to join together the dissimilar materials, that is, the mild steel with the pure aluminum member, or the 5000 series aluminum alloy member by use of the aluminum wire incorporating the flux of a fluoride composition as disclosed in Patent Documents 13, 14, respectively. However, in the case of weld-bonding of high-strength dissimilar materials with each other, that is, the high-strength steel member with the high-strength 6000 series aluminum alloy member, by use of the aluminum wire incorporating the flux of the fluoride composition as disclosed in Patent Documents 13, 14, respectively, it is not possible to obtain a high bonding strength. The same applies to the flux of a fluoride composition in the case of the spot welding as disclosed in Patent Document 15.

This is because the brittle Fe—Al intermetallic compound at the joint of the low-strength dissimilar materials joined with each other differs in generation conditions from that at the joint of the high-strength dissimilar materials joined with each other as previously described, and in order to obtain a reliable and high bonding strength, it is necessary to devise and create new joining conditions for joining the high-strength dissimilar materials with each other. To put it another way, in reality, there have never been proposed conditions required for the flux composition, and so forth, in melt weld-bonding of the high-strength dissimilar materials with each other, that is, the high-strength steel member with the high-strength 6000 series aluminum alloy member.

The invention has been developed to solve those problems described. It is an object of the invention to provide a flux cored wire for joining dissimilar materials with each other, capable of enhancing a bonding strength in melt weld-bonding of the high-strength dissimilar materials with each other, that is, the high-strength steel member with the high-strength 6000 series aluminum alloy member, in particular, and excellent in welding efficiency, and to provide a method for joining the dissimilar materials with each other.

Further, another object of the invention is to provide a joining method capable of obtaining a high bonding strength by preventing formation of a brittle intermetallic compound at a joint when joining an aluminum-base material with a steel-base material while forming a sound bead and to provide a bonded joint obtained by the method. The invention is intended to enable continuous joining to be implemented by use of the method according to the invention, the continuous joining being under fewer constraints in geometrics and excellent in workability besides being under fewer constraints in application conditions, and so forth, and excellent in general versatility.

Still further, it is still another object of the invention to provide a method for joining the dissimilar materials such as a steel member, and an aluminum member together, by arc welding capable of executing welding with a high bonding strength even if the steel member is a galvanized steel member.

To that end, in accordance with one aspect of the invention, there is provided a flux cored wire for joining dissimilar materials together, comprising a flux used for joining of dissimilar materials including an aluminum member or an aluminum alloy member and a steel member, with each other and an aluminum alloy envelope, the interior thereof being filled up with the flux, wherein the flux has fluoride composition containing $AlF_3$ in a range of 0.1 to 15 mass % against the total mass of the flux cored wire without containing chloride. Further, the flux in a range of 0.3 to 20 mss % against the total mass of the flux cored is preferably filled in the interior of the aluminum alloy envelope.

Herein, in order to enhance a bonding strength, the following mode is preferably adopted. More specifically, an aluminum alloy of the envelope preferably contains Si in a range of 1 to 13 mass %, the balance being composed of Al and unavoidable impurities. Further, the aluminum alloy of the envelope preferably further contains Mn in a range of 0.1 to 0.3 mass %. Still further, the steel member is preferably a galvanized steel member.

If the flux cored wire according to the invention is applied to joining of a high tensile steel member with a 6000 series aluminum alloy member, this is particularly preferable.

In another aspect of the invention, there is provided a method for joining dissimilar materials together comprising the step of melt-welding the dissimilar materials including a high tensile steel member and a 6000 series aluminum alloy member, with each other, by use of the flux cored wire of preferred modes described above, or described above and to be described later.

To that end, there may be provided a method for joining dissimilar materials together comprising the step of an AC-MIG welding for directly joining an aluminum member or an aluminum alloy member with a steel member by use of a flux cored wire formed by coating a flux containing potassium fluoride, aluminum fluoride, and at least one fluoride selected from the group consisting of magnesium fluoride, calcium fluoride, strontium fluoride, and barium fluoride with aluminum or an aluminum alloy, as a filler metal.

The steel member described as above is preferably a galvanized steel member.

In still another aspect of the invention, there is provided a bonded joint wherein a steel based member is joined with an aluminum based member by any of the methods for joining dissimilar materials together, described in the foregoing.

A method for joining dissimilar materials together may comprises the step of joining an aluminum member or an aluminum alloy member with a steel member by either an AC-MIG welding or a MIG welding by DC reversed polarity with the use of a flux cored wire, wherein the flux cored wire is formed by filling up the interior of an envelope made up of an aluminum member or an aluminum alloy member with a flux, the flux for filling up is mixed with aluminum fluoride, and potassium fluoride to be turned into a mixed flux, and a loading weight of the mixed flux is in a range of 0.1 to 24 mass %, against the total mass of the flux cored wire.

The method for joining dissimilar materials together, described as above, is preferably applied to a galvanized steel member such as a hot-dip galvanized steel sheet, relatively large in plating thickness, poorer in weldability than a bare steel, and exhibiting pronounced deterioration in bonding strength, and so forth, The mixed flux described as above preferably has a melting point in a range of 560 to 700° C., and the flux cored wire is preferably not more than 1.6 mm Φ in diameter.

Effect of the Invention

In order to enhance a bonding strength in melt weld-bonding of high-strength dissimilar materials with each other, such as the high-strength steel member and the high-strength 6000 series aluminum alloy member with each other to a reliability level, and practicality level, there is the need for checking generation of a brittle intermetallic compound at a joint more than in the case of joining low-strength dissimilar materials with each other.

Accordingly, the flux used in the melt weld-bonding of dissimilar materials with each other is required to have not only effects of removing an oxide film formed on the surface of a member to be welded, such as an aluminum alloy member, by reduction, but also effects of checking growth of an Fe—Al intermetallic compound layer generated in a weld zone of the steel member. In order for the flux to exhibit the effects of checking the growth of the Fe—Al intermetallic compound layer, the flux used in the melt weld-bonding of the dissimilar materials with each other is required to act on the surface of the steel member, thereby fulfilling a function for blocking interdiffusion between Fe and Al.

The inventor, et al. have found out that effects of an action for blocking the interdiffusion between Fe and Al are profoundly exhibited in a flux of fluoride composition, or fluoride-base, particularly, in a flux containing $AlF_3$ (aluminum fluoride). In other words, a flux of fluoride composition not containing $AlF_3$ is small in the effects of the action for blocking the interdiffusion between Fe and Al as compared with the flux of the fluoride composition containing $AlF_3$. Accordingly, the flux of fluoride composition not containing $AlF_3$ is capable of enhancing a bonding strength in melt weld-bonding of low-strength dissimilar materials with each other, but cannot enhance the bonding strength up to the reliability level, and the practicality level in the melt weld-bonding of the high-strength dissimilar materials with each other, such as the high-strength steel member and the high-strength 6000 series aluminum alloy member with each other.

A mechanism for the flux of the fluoride composition containing $AlF_3$ exhibiting the effects of the action for blocking the interdiffusion between Fe and Al, and the effects of checking the growth of the Fe—Al intermetallic compound layer still remains unclear. It is presumed, however, that there is a good possibility of a specific compound being formed to a small thickness on the surface (a joint surface) of the steel member beforehand, and such a product blocking or checking the interdiffusion between Fe and Al.

That is, it is resumed that the specific compound formed on the surface of the steel member acts so as to delay a time when the Fe—Al intermetallic compound layer (an interfacial reaction layer) is formed between the steel member and the aluminum alloy member, so that direct joining of Fe and Al, along with progress in the melt welding, will not be blocked.

Thus, the invention provides the flux cored wire using the flux of fluoride composition containing $AlF_3$, the flux being filled in the interior of the envelope. Accordingly, the invention has excellent effects of providing an aggregate of dissimilar materials joined, and the method for joining dissimilar materials together, capable of enhancing a bonding strength in melt weld-bonding of high-strength dissimilar materials with each other, in particular, the high-strength steel member with the high-strength 6000 series aluminum alloy member, and excellent in welding efficiency.

Further, with the invention, the flux containing aluminum fluoride and potassium fluoride, with addition of high melting point fluorides, is used as a filler material, thereby checking evaporation of the flux at the time of welding, and improving workability. By use of the flux, excessive spread of a weld metal composed of aluminum is checked, thereby forming a sound bead, and generation of the brittle intermetallic compound at a joint is prevented, so that it is possible to obtain a high bonding strength.

Still further, if the AC-MIG welding is adopted as welding means, this method has fewer constraints in application conditions, and so forth, excellent general versatility, fewer constraints in geometries, and capability of continuous joining, so that joining of an aluminum base member with a steel base member can be efficiently implemented.

Further, with invention, when a fluoride-based mixed flux is used in welding, dissimilar materials are joined together by use of either the AC-MIG welding, or the MIG welding by DC reversed polarity, relatively low in working current, in the case of the arc welding. By so doing, scattering of the fluoride-based mixed flux itself is prevented, thereby improving welding workability.

Still further, with invention, use is made of the flux cored wire formed by filling up the interior of the envelope of the aluminum material with the flux instead of coating the weld zone directly with the fluoride-based mixed flux as with the case of the conventional technology previously described. By so doing, the scattering of the fluoride-based mixed flux itself is prevented, thereby improving the welding workability.

Yet further, with invention, for the flux filled up in the wire, use is made of a mixed flux of a specified composition, mixed with aluminum fluoride, and potassium fluoride, among fluoride-based mixed fluxes. And the loading weight of the mixed flux is set relatively small to fall in a range of 0.1 to 24 mass %, against the total mass of the flux cored wire. By so doing, it becomes possible to enhance a bonding strength even in the case of bimetallic joining of a galvanized steel member such as a steel member coated with hot-dipped zinc plating, and so forth. In addition, by so doing, scattering of the fluoride-based mixed flux itself is prevented, ensuring improvement in welding workability.

As a result, according to the invention, when an aluminum member is joined with a steel member, there are fewer constraints in application conditions, and so forth, excellent general versatility, and fewer constraints in geometries. Furthermore, it is possible to provide a joining technology whereby continuous joining, necessary in the case of line welding, is enabled, generation of the brittle Fe—Al intermetallic compound at a joint, and occurrence of blowholes in the weld zone are reduced, deterioration in corrosion resistance is less, and welding workability is improved. Accordingly, the invention can provide a bonded joint of dissimilar materials (welded joint of dissimilar materials) applicable to structural members of the automobile, and so forth.

DESCRIPTION OF REFERENCE NUMERALS

Figure 1:
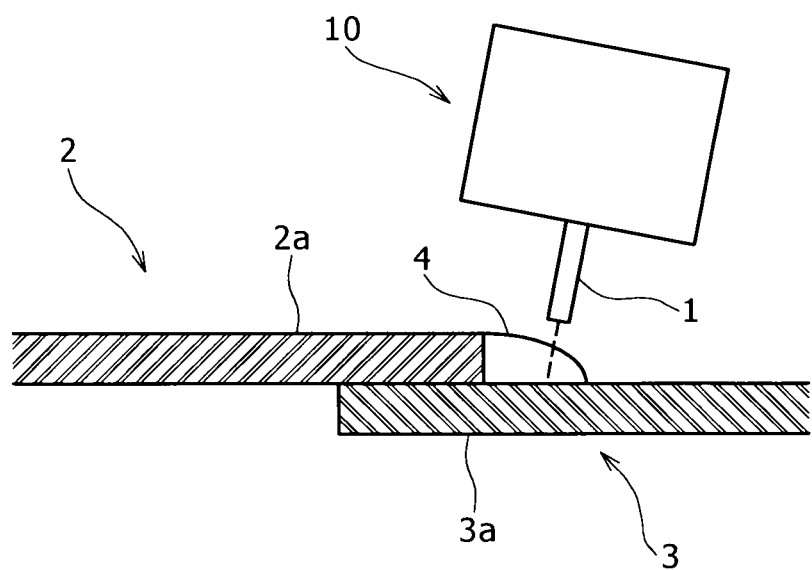
FIG. 1 is sectional view showing one embodiment of a method for joining dissimilar materials with each other, according to the invention.

1: flux cored wire (wire with a flux incorporated therein)
2: aluminum member
3: steel member
4: weld metal
5: weld line
6: flux
7: aluminum member
10: welding torch

BEST MODE FOR CARRYING OUT THE INVENTION

There are specifically described hereinafter embodiments of the invention and reasons for limitations of various requirements.

Further, the invention is more specifically described hereinafter with reference to working examples. It is to be understood, however, that the invention be not limited to those working examples, and it is obvious that modifications and variations as appropriate may be made in the invention in light of the teachings described hereinbefore and hereinafter without departing from the spirit and scope of the invention

[1]
(Flux Cored Wire)

A flux cored wire for use in joining dissimilar materials together, according to one embodiment of the invention, is a flux cored wire covered with a tubular envelope (also called a hoop) filled up with a flux in order to enhance efficiency in melt-welding. The flux cored wire has an advantage in its applicability for melt-welding in the case of either highly efficient fully automatic welding, or semiautomatic welding.

As for a wire diameter of the flux cored wire, it need only be sufficient to select an optimum diameter according to welding workability including the characteristics of a wire feeder, for use in execution of welding in the case of either the highly efficient fully automatic welding, or the semiautomatic welding, and so forth. For example, in the case of common $CO_2$ gas shield arc welding, MIG welding, and so forth, use may be made of a small diameter on the order of 0.8 to 1.6 mm $\phi$ for general purpose use.

As for a method for manufacturing the flux cored wire, a formed wire tubular in shape is first fabricated by a process comprising the steps of forming an aluminum alloy hoop for the envelope into a shape resembling the letter U, filling up a formed hoop in the shape resembling the letter U with a flux, forming a U-shaped hoop into a tubular wire, and so forth. Thereafter, the flux cored wire can be manufactured by a common manufacturing method comprising the step of drawing the formed wire tubular in shape so as to have a product FCW diameter.

The flux cored wire (hereinafter referred to merely as a wire, or an FCW) generally includes a type having a line of juncture (crevice, opening: hereinafter referred to also as a seam) on the hoop, and a seamless type having no crevice (without the line of juncture), fabricated by sealing a line of juncture by welding and so forth. With the invention, any of those types may be used. Further, there are several types of cases as to a shape into which an end of an aluminum sheet is folded at the time of the tubular wire being formed, lack or presence of seam welding, and so forth, however, with the invention, use may be made of any of those types.

(An Aluminum Alloy for Envelope)

For a tubular envelope (called also as a hoop) of the flux cored wire, use is made of an aluminum alloy band instead of a steel band normally in use in order to check formation of an Fe—Al intermetallic compound layer between steel and an aluminum alloy member.

In this case, an aluminum alloy making up the envelope preferably contains Si in a range of 1 to 13 mass %, the balance being composed of Al and unavoidable impurities. The main reason for this is because of necessity of securing fluidity of aluminum alloy in a molten state, the strength of a joint after solidification, the strength of the envelope, and so forth. If Si content is too low, this will cause deterioration in the fluidity, and strength. On the contrary, if Si content excessively increases, this will cause weld metal to be more prone to be brittle besides a tendency of enhancement in the fluidity reaching saturation. Hence, if Si is to be contained, the Si content is to fall in the range of 1 to 13 mass %.

In this connection, the less the Si content, the stronger will be a tendency of enhancement in ductility, so that in the case of application of the envelope to automobile members of which impact resistance properties, and so forth are required, use is suitably made of an aluminum alloy having Si content on a lower side, particularly in a range of 1 to 3 mass %. In contrast, in the case of high precision being required of an FCW-feed capacity in the MIG welding, and so forth, the envelope needs strength, in which the envelope preferably has Si content in a range of 9 to 13 mass %.

The aluminum alloy making up the envelope preferably further contains Mn in a range of 0.1 to 0.3 mass %, in addition to Si, the balance being composed of Al and unavoidable impurities. The main reason for this is because of necessity of further securing the fluidity of the aluminum alloy in the molten state, the strength of the joint after solidification, the strength of the envelope, and so forth. If Mn content is too low, those effects described are not obtained. On the contrary, if Mn content excessively increases, this will cause the weld metal to be more prone to be brittle besides the tendency of enhancement in the fluidity reaching saturation. Hence, if Mn is to be contained, the Mn content is to fall in the range of 0.1 to 0.3 mass %.

For an envelope of such an aluminum alloy composition as above-described, use is preferably made of an aluminum alloy filler metal standardized for general use. For the aluminum alloy filler metal of the aluminum alloy composition described, use is preferably made of an A4047 type containing Si in a range of 11.0 to 13.0 mass %, and not more than 0.15 mass % of Mn. Further, use can be also made of an A4043 type containing Si in a range of 4.5 to 6.0 mass %, and not more than 0.05 mass % of Mn.

(Flux Composition)

The flux filled in the interior of the envelope, according to the invention, is assumed to have fluoride composition without containing chloride. If a chloride remains in a weld zone, the chloride acts as a factor for promotion of corrosion of the weld zone, or the aggregate of the dissimilar materials joined, and therefore, chloride content is to be controlled. The flux preferably contains no chloride therein at all, however, taking cost and practicality into consideration, with the invention, chloride content is permissible provided that the same is within a range where corrosion is not promoted. As a guide for this condition, chloride content is to be kept to not more than 1 mol % against the flux in total.

The flux according to the invention similarly permits the case where oxide is contained as a constituent of the flux. More specifically, aluminum oxide, sodium oxide, lithium oxide, diphosphorous pentaoxide, and so forth may be added as appropriate within a range where effects of fluoride are not impaired. The upper limit of oxide content is on the order of about 30 mol % against the flux in total.

There are cases where it is possible to obtain advantageous effects of controlling excessive wetting of molten metal, and so forth, besides decrease in spattering at the time of welding, if aluminum alloy powders are mixed with the flux according to the invention to be subsequently added thereto.

The flux serving as a core material is structured so as to be enclosed by the envelope of the aluminum alloy, however, if a loading weight of the flux in the envelope is insufficient, the flux is not stabilized in weight, so that there arises a problem of variation occurring to the loading weight (filling factor, content) of the flux by the region of FCW. To cope with this problem, in the case of the loading weight of the flux being insufficient, in particular, it is preferable to mix the flux and the aluminum alloy powders with the envelope to be filled therein because that will eliminate or alleviate the problem, and can concurrently gain the advantage of facilitating fabrication itself of FCW.

Further, if an addition weight of the aluminum alloy powders added to the flux is excessively large, there can be the case where a problem occurs to the FCW-feed capacity besides a possibility that an arc becomes unstable in the case of arc welding. For this reason, excessively large addition of the aluminum alloy powders to the flux should be avoided. If aluminum alloy powders added to the flux is basically identical in material kind to the composition of the envelope of the aluminum alloy, this will suffice. Otherwise, use may be made of aluminum alloy powders differing from the envelope of the aluminum alloy. The aluminum alloy powders described as above include the aluminum alloy powders of, for example, A1000 series, 3000 series, 4000 series, 5000 series, 6000 series, and so forth.

(Fluoride Composition)

For the basic composition of the flux according to the invention, a fluoride composition is adopted in order to exhibit effects of removing an oxide film formed on the surface of a member to be welded, such as an aluminum alloy member, by reduction, or by dissolution. The aluminum alloy member before being joined has a very sturdy oxide film formed on the surface thereof, which interferes with energization at the time of welding. Accordingly, if the effects of removing the oxide film on the surface by reduction are insufficient, a bonding strength cannot be enhanced up to the reliability level, or the practicality level in the case of joining high-strength dissimilar materials with each other, such as a high-strength steel member, and a 6000 series aluminum alloy member, with each other, by melt weld-bonding.

For a fluoride having those effects described as above, use is preferably made of a material containing at least one fluoride selected from the group consisting of $K_3AlF_6$, $K_2AlF_6$, KF, AlF, CaF, LiF, $KAlF_4$, $K_2TiF_6$, $K_2ZrF_6$, $ZnF_2$, $ZnSiF_6$, and so forth. Further, it is necessary to avoid use of a fluoride likely to act the factor for promotion of the corrosion as is the case with the chloride as previously described if the fluoride remains in the weld zone. The fluorides described as above by way of example are low in solubility into an aqueous solution, so that those fluorides have few deleterious influences described as above. In contrast, fluorides such as cesium fluoride ($CsATF_4$), and so forth, having solubility into an aqueous solution, far in excess of 100 g/ml, are prone to act as the factor for promotion of the corrosion, and use thereof therefore should be avoided.

(AlF$_3$)

The invention has the largest feature in that AlF$_3$ (aluminum fluoride) in a range of 0.1 to 15 mass %, preferably in a range of 0.4 to 15 mass % against the total mass of the flux cored wire is in the flux of the fluoride composition described as above in order to exhibit effects of an action for blocking interdiffusion between Fe and Al, and effects of checking growth of an Fe—Al intermetallic compound layer.

As described in the foregoing, with the flux of the fluoride composition, particularly, with the flux containing AlF$_3$, there are profoundly exhibited the effects of the action for blocking the interdiffusion between Fe and Al, and the effects of checking the growth of the Fe—Al intermetallic compound layer. With the flux of the fluoride composition containing AlF$_3$, a specific compound is formed to a small thickness on the surface (a joint surface) of the steel member beforehand, and timing for forming the Fe—Al intermetallic compound layer between the steel member, and the aluminum alloy member during melt welding is delayed, thereby blocking, or checking the interdiffusion between Fe and Al.

If AlF$_3$ content is too low, the effects of the action for blocking the interdiffusion between Fe and Al will be insufficient as with the case of a flux of a fluoride composition not containing AlF$_3$. For this reason, in the case of joining the high-strength dissimilar materials, such as the high-strength steel member, and the 6000 series aluminum alloy member, with each other, by melt welding, the bonding strength cannot be enhanced up to the reliable level, or the practical level.

On the other hand, as the AlF$_3$ content increases, so does the thickness of the Fe—Al intermetallic compound layer, however, if the AlF$_3$ content is excessively high, this will cause another problem of an increase in spattering and evolution of fume besides the advantageous effects thereof coming to be saturated. Hence, the AlF$_3$ content in the flux of the fluoride composition is to fall in a range of 0.1 to 15 mass %, preferably in a range of 0.4 to 15 mass %, against the total mass of the flux cored wire.

AlF$_3$ may be contained not necessarily in the form of AlF$_3$ but in the form of K$_3$AlF$_6$, (25 AlF$_3$+75 KF), and K$_2$AlF$_6$, (33 AlF$_3$+67 KF), respectively.

(Flux Loading Weigh)

The loading weight of the fluoride-based flux in the envelope of the aluminum alloy (weight of the fluoride-based flux in the flux cored wire) corresponds to a range of 0.3 to 20 mass % against the total mass of the flux cored wire. If the loading weight of the fluoride-based flux in the envelope of the aluminum alloy exceeds 20 mass % against the total mass of the flux cored wire, this will cause the effects of the oxide film formed on the surface of the member to be welded being removed as a result of reduction to become excessively large. Accordingly, a molten region excessively expands, causing rather growth of the Fe—Al intermetallic compound layer, so that there arises a problem with welding strength. Besides, there occurs an increase in spattering, and evolution of fume, thereby causing a problem of impairing workability and the external appearance of the weld zone. On the contrary, if the loading weight of the fluoride-based flux in the envelope of the aluminum alloy is less than 0.3 mass % against the total mass of the flux cored wire, the addition effects of the fluoride-based flux will be insufficient. In order to ensure the effects of the flux with reliability, the loading weight of the flux corresponds more preferably to a range of 5 to 15 mass % against the total mass of the flux cored wire.

(Melt Welding Method)

Since there is no particular limitation to a melt welding method adopted in the joining of the dissimilar metal members, according to the invention, use can be made of a general-purpose melt welding method employing a heat source such as an arc, a laser, and so forth. For example, the MIG method, TIG method, and laser method, or a hybrid welding method thereof can be used. Upon actual application of melt welding, various factors, such as the envelope of the flux cored wire, the flux composition, and so forth, are taken into consideration according to the shape as well as the kind of each of the members to be welded together, and the structure as well as the shape of the aggregate of the dissimilar materials joined, or joint characteristics as required, thereby selecting a welding method, and optimizing welding conditions.

A common welding mechanism (process) in the case of the flux cored wire according to the invention being applied to the method for melt welding the dissimilar materials, such as the steel member—the aluminum alloy member, is as described hereunder regardless of any method selected out of those melt welding methods.

First, an aluminum alloy among respective portions of the aluminum alloy member and the steel member, to be welded, undergoes partial melting due to heat being inputted from a suitable source. Almost simultaneously, there occurs melting of the flux cored wire according to the invention, fed in the vicinity of the weld zone of the steel member—the aluminum alloy member. At this point in time, melting will not occur on the steel member side of the weld zone if an appropriate heat input condition is set. Further, the oxide film on the surface of the aluminum alloy member is removed by reduction by the agency of the flux in as-molten state, whereupon an aluminum alloy constituent of the envelope of the flux cored wire causes wetting of the surface of the aluminum alloy member to be then spread. Thereafter, as an input heat quantity decreases, a molten zone undergoes solidification, thereby forming a joint.

With the welding mechanism, the flux cored wire according to the invention executes not only removal by reduction of the oxide film on the surface of the member to be welded but also checks the growth of the brittle Fe—Al intermetallic compound to be generated in the weld zone of the steel member during the flux being in as-molten state. That is, the flux according to the invention, containing AlF$_3$, in as-molten state, acts on the surface of steel, and fulfils a function for blocking the interdiffusion between Fe and Al, thereby enhancing the bonding strength of the aggregate of the dissimilar materials joined.

(Sheet Thickness of the Steel Member)

A sheet thickness of the steel member of the joint of the dissimilar materials is preferably in a range of 0.3 to 3.0 mm. If the sheet thickness of the steel member is less than 0.3 mm, it is not possible to ensure strength and rigidity required of the structural member, and structural material, which is improper. If the sheet thickness of the steel member exceeds 3.0 mm, it is not possible to attain reduction in weight of the steel member serving as the structural member, or the structural material.

(The Steel Member)

There is no particular limitation to a shape of the steel member for use in the invention, and use can be made of the steel member in any shape as appropriate, such as a steel sheet, section steel, steel pipe, and so forth, for general use as the structural member, or diverted from application for the structural member, provided, however, that the steel member is a high tensile steel (Hi-Ten) having tensile strength not lower than 400 MPa, preferably not lower than 500 MPa in order to obtain a light-weight high-strength structural member (the aggregate of the dissimilar materials joined) such as an automobile member.

In general, low-strength steel having tensile strength lower than 400 MPa, and mild steel are each mostly low alloy steel, and an oxide film thereof is composed of iron oxide, so that the interdiffusion between Fe and Al is facilitated, and the brittle Fe—Al intermetallic compound is prone to be formed. Furthermore, there will be an increase in the sheet thickness necessary for obtaining strength as required, so that reduction in weight will have to be sacrificed.

(Zinc Plating)

If zinc plating is provided on the surface of the steel member to be joined (at least a joint surface thereof, against the aluminum alloy member) beforehand, this will enhance wettability of the flux. Furthermore, since the zinc plating is on the joint surface interposed between the steel member, and the aluminum alloy member, there can be gained the advantage of the aggregate of the dissimilar materials joined having excellent corrosion resistance. Still further, there can be gained effects of enhancing the bonding strength by the agency of the following action. Also, at the time of welding, the zinc plating has effects of delaying timing of forming an interfacial reaction layer that is the Fe—Al intermetallic compound. Yet further, presence (interposition) of the zinc plating causes an increase in resistance heating value at the tine of the melt welding, a diffusion rate at an interface between aluminum and steel considerably increases, and aluminum undergoes diffusion toward steel, thereby gaining effects of quickly ensuring an excellent jointing state.

The known zinc plating on the steel member, such as pure zinc plating, alloy zinc plating, alloying zinc plating, and so forth, is applicable to the zinc plating described as above. Further, plating means may include electroplating, hot-dip plating, alloying treatment applied after the hot-dip plating, and so forth, and there is no particular limitation to the plating means. A thickness of the zinc plating, in a normal film thickness (average film thickness) range of 1 to 20 μm, is sufficient. If the thickness is too small, a zinc plating film is melted to be discharged from the joint at the outset of joining at the time of welding, thereby failing to exhibit the effects of checking formation of the interfacial reaction layer. In contrast, if the thickness is too large, a large input heat value is required for melting and discharging zinc form the joint. If the input heat value increases, this will cause an increase in quantity of the aluminum alloy member in the molten state, resulting in an increase in reduction value of section thickness on the side of the aluminum alloy member, due to occurrence of chill, so that there is a possibility that the aggregate of the dissimilar materials joined cannot be used as the structural member.

(Aluminum Alloy Member)

There is no particular limitation to a shape of an aluminum alloy member for use in the invention, and selection, as appropriate, is made of a sheet member, shaped member, forged member, or cast member, and so forth, for general use according to properties required of respective structural members, provided, however, that the higher the strength of the aluminum alloy member, the more preferable it is as the structural member as with the case of the steel member. In this respect, use is made of A6000 series aluminum alloy of Al—Mg—Si base, high in strength, less in amounts of alloying elements, and excellent in recyclability, for general use as this type of the structural member, among the aluminum alloy members.

A sheet thickness of the aluminum alloy member for use in the invention is preferably in a range of 0.5 to 4.0 mm. If the sheet thickness of the aluminum alloy member is less than 0.5 mm, the aluminum alloy member is found lacking in strength as the structural material for the automobile, and so forth, and absorbency of energy at the time of vehicle body collision, which is improper. On the other hand, if the sheet thickness of the aluminum alloy member exceeds 4.0 mm, it becomes impossible to attain reduction in weight of the aluminum alloy member serving as the structural member, or the structural material, as with the case of the steel member.

[Working Examples]

There are described hereinafter working examples according to one embodiment of the invention. BY applying melt-welding to a commercially available A6063 aluminum alloy sheet overlaid on a commercially available alloying zinc hot-dip steel sheet (GA) steel sheet (Hi-Ten) of 590 MPa class, aggregates of the dissimilar materials joined together were fabricated, and bonding strengths were evaluated.

TABLE 1

| | | | Flux | | | Welded joint | |
| | | | | | | properties | |
| | | | Flux content | AlF$_3$ content | | | |
| | | Composition | (against a total | (against a total | | External | Breaking |
| | | (numerical values indicate | mass of FCW) | mass of FCW) | Welding | appearance | strength |
| Classification | No. | mixed mol ratios) | mass % | mass % | method | of a bead | N/mm |
|---|---|---|---|---|---|---|---|
| Working | 1 | 40AlF$_3$—60KF | 0.3 | 0.12 | MIG | 3 | ◯ |
| example | 2 | 40AlF$_3$—60KF | 1 | 0.40 | MIG | 4 | ◯ |
| | 3 | 40AlF$_3$—60KF | 5 | 2.00 | MIG | 4 | ◉ |
| | 4 | 40AlF$_3$—60KF | 10 | 4.00 | MIG | 4 | ◉ |
| | 5 | 40AlF$_3$—60KF | 15 | 6.00 | MIG | 4 | ◉ |
| | 6 | 40AlF$_3$—60KF | 20 | 8.00 | MIG | 3 | ◉ |
| | 7 | 75AlF$_3$—25KF | 0.3 | 0.23 | Laser | 3 | ◯ |
| | 8 | 75AlF$_3$—25KF | 1 | 0.75 | Laser | 3 | ◯ |
| | 9 | 75AlF$_3$—25KF | 5 | 3.75 | Laser | 4 | ◉ |
| | 10 | 75AlF$_3$—25KF | 10 | 7.50 | Laser | 4 | ◉ |
| | 11 | 75AlF$_3$—25KF | 15 | 11.25 | Laser | 4 | ◉ |
| | 12 | 75AlF$_3$—25KF | 20 | 15.00 | Laser | 3 | ◉ |
| | 13 | K$_3$AlF$_6$ | 0.3 | 0.10 | Laser | 3 | ◯ |
| | 14 | K$_3$AlF$_6$ | 1 | 0.25 | Laser | 4 | ◯ |
| | 15 | K$_3$AlF$_6$ | 5 | 1.25 | Laser | 4 | ◉ |
| | 16 | K$_3$AlF$_6$ | 10 | 2.50 | Laser | 4 | ◉ |

TABLE 1-continued

| Classification | No. | Flux Composition (numerical values indicate mixed mol ratios) | Flux content (against a total mass of FCW) mass % | AlF₃ content (against a total mass of FCW) mass % | Welding method | External appearance of a bead | Breaking strength N/mm |
|---|---|---|---|---|---|---|---|
| | 17 | K₃AlF₆ | 15 | 3.75 | Laser | 4 | ◎ |
| | 18 | K₃AlF₆ | 20 | 5.00 | Laser | 3 | ◎ |
| | 19 | K₂AlF₅ | 0.3 | 0.10 | MIG | 3 | ○ |
| | 20 | K₂AlF₅ | 1 | 0.33 | MIG | 4 | ○ |
| | 21 | K₂AlF₅ | 5 | 1.65 | MIG | 4 | ◎ |
| | 22 | K₂AlF₅ | 10 | 3.30 | MIG | 4 | ◎ |
| | 23 | K₂AlF₅ | 15 | 4.95 | MIG | 4 | ◎ |
| | 24 | K₂AlF₅ | 20 | 6.60 | MIG | 3 | ◎ |

TABLE 2

| Classification | No. | Flux Composition (numerical values indicate mixed mol ratios) | Flux content (against a total mass of FCW) mass % | AlF₃ content (against a total mass of FCW) mass % | Welding method | External appearance of a bead | Breaking strength N/mm |
|---|---|---|---|---|---|---|---|
| Working example | 25 | 10AlF₃—45LiF—30Na₂O—15P₂O₅ | 0.3 | 0.03 | MIG | 3 | ○ |
| | 26 | 10AlF₃—45LiF—30Na₂O—15P₂O₅ | 1 | 0.10 | MIG | 4 | ○ |
| | 27 | 10AlF₃—45LiF—30Na₂O—15P₂O₅ | 5 | 0.50 | MIG | 4 | ◎ |
| | 28 | 10AlF₃—45LiF—30Na₂O—15P₂O₅ | 10 | 1.00 | MIG | 4 | ◎ |
| | 29 | 10AlF₃—45LiF—30Na₂O—15P₂O₅ | 15 | 1.50 | MIG | 4 | ◎ |
| | 30 | 10AlF₃—45LiF—30Na₂O—15P₂O₅ | 20 | 2.00 | MIG | 3 | ◎ |
| Comparative example | 31 | 40AlF₃—60KF | 0.1 | 0.04 | MIG | 1 | △ |
| | 32 | 40AlF₃—60KF | 30 | 12.00 | MIG | 2 | △ |
| | 33 | 75AlF₃—25KF | 0.1 | 0.08 | Laser | 2 | △ |
| | 34 | 75AlF₃—25KF | 30 | 22.50 | Laser | 2 | △ |
| | 35 | K₃—AlF₆ | 0.1 | 0.03 | Laser | 1 | △ |
| | 36 | K₃—AlF₆ | 30 | 7.50 | Laser | 2 | ○ |
| | 37 | K₂—AlF₅ | 0.1 | 0.03 | MIG | 2 | △ |
| | 38 | K₂—AlF₅ | 30 | 9.90 | MIG | 2 | ○ |
| | 39 | 10AlF₃—45LiF—30Na₂O—15P₂O₅ | 0.1 | 0.01 | MIG | 1 | △ |
| | 40 | 10AlF₃—45LiF—30Na₂O—15P₂O₅ | 30 | 3.00 | MIG | 2 | ○ |
| | 41 | 20CaF—80KF | 0.1 | 0.00 | MIG | 1 | X |
| | 42 | 20CaF—80KF | 30 | 0.00 | MIG | 2 | △ |

TABLE 3

| Classification | No. | K₃AlF₆ flux Flux content (against a total mass of FCW) mass % | AlF₆ content (against a total mass of FCW) mass % | Aluminum alloy of an envelope Si content mass % | Mn content mass % | Welding method | External appearance of a bead | Breaking strength N/mm | Elongation % |
|---|---|---|---|---|---|---|---|---|---|
| Working example | 43 | 15 | 3.75 | 1.0 | 0.03 | Laser | 3 | ○ | ○ |
| | 44 | 15 | 3.75 | 1.5 | 0.03 | Laser | 3 | ○ | ○ |
| | 45 | 15 | 3.75 | 2.0 | 0.03 | Laser | 3 | ◎ | ◎ |
| | 46 | 15 | 3.75 | 2.5 | 0.03 | Laser | 4 | ◎ | ◎ |
| | 47 | 15 | 3.75 | 2.9 | 0.03 | Laser | 4 | ◎ | ◎ |
| | 48 | 15 | 3.75 | 3.2 | 0.03 | Laser | 4 | ◎ | ○ |
| | 49 | 15 | 3.75 | 5.0 | 0.03 | Laser | 4 | ◎ | ○ |
| | 50 | 15 | 3.75 | 12.0 | 0.03 | Laser | 4 | ◎ | ○ |
| | 51 | 15 | 3.75 | 2.5 | 0.08 | Laser | 4 | ◎ | ◎ |
| | 52 | 15 | 3.75 | 2.5 | 0.15 | Laser | 4 | ◎ | ○○○ |
| | 53 | 15 | 3.75 | 2.5 | 0.28 | Laser | 4 | ◎ | ○○○ |
| | 54 | 15 | 3.75 | 1.0 | 0.03 | MIG | 3 | ○ | ○ |
| | 55 | 15 | 3.75 | 1.5 | 0.03 | MIG | 3 | ○ | ○ |
| | 56 | 15 | 3.75 | 2.0 | 0.03 | MIG | 3 | ◎ | ◎ |

TABLE 3-continued

| | | K₃AlF₆ flux | | Aluminum alloy of an envelope | | | Welded joint properties | | |
|---|---|---|---|---|---|---|---|---|---|
| | | Flux content | AlF₆ content | | | | External | Breaking | |
| | | (against a total | (against a total | | | | | | |
| Classification | No. | mass of FCW) mass % | mass of FCW) mass % | Si content mass % | Mn content mass % | Welding method | appearance of a bead | strength N/mm | Elongation % |
| | 57 | 15 | 3.75 | 2.5 | 0.03 | MIG | 4 | ◉ | ◉ |
| | 58 | 15 | 3.75 | 2.9 | 0.03 | MIG | 4 | ◉ | ◉ |
| | 59 | 15 | 3.75 | 3.2 | 0.03 | MIG | 4 | ◉ | ○ |
| | 60 | 15 | 3.75 | 5.0 | 0.03 | MIG | 4 | ◉ | ○ |
| | 61 | 15 | 3.75 | 12.0 | 0.03 | MIG | 4 | ◉ | ○ |
| | 62 | 15 | 3.75 | 2.5 | 0.08 | MIG | 4 | ◉ | ◉ |
| | 63 | 15 | 3.75 | 2.5 | 0.15 | MIG | 4 | ◉ | ○○○ |
| | 64 | 15 | 3.75 | 2.5 | 0.28 | MIG | 4 | ◉ | ○○○ |
| Comparative example | 65 | 15 | 3.75 | 0.7 | 0.03 | Laser | 1 | ○ | Δ |
| | 66 | 15 | 3.75 | 14.0 | 0.03 | Laser | 4 | ○ | X |
| | 67 | 15 | 3.75 | 2.5 | 0.35 | Laser | 4 | ○ | Δ |
| | 68 | 15 | 3.75 | 0.7 | 0.03 | MIG | 1 | ○ | Δ |
| | 69 | 15 | 3.75 | 14.0 | 0.03 | MIG | 4 | ○ | X |
| | 70 | 15 | 3.75 | 2.5 | 0.35 | MIG | 4 | ○ | Δ |

In Tables 1, and 2, there are shown the working examples obtained by variously changing flux composition, flux content (mass %: content against a total mass of FCW, and a welding method In Table 3, there are shown the working examples obtained by variously changing the welding method, and Mn content as well as Si content of an aluminum alloy of an envelope while $K_3AlF_6$ (25 $AlF_3$+75 KF), as the composition of a flux, is kept constant, and the flux content and $AlF_3$ content of the flux are also kept constant.

(Member to be Welded)

In common with Tables 1 to 3, an A6063 aluminum alloy sheet 2.5 mm in sheet thickness, and a GA steel sheet 1.2 mm in sheet thickness were prepared, and disposed such that the aluminum alloy sheet was overlapped over the GA steel sheet with a mutual lapping width kept in a range of 5 to 20 mm.

(Melt Welding Method)

In common with Tables 1 to 3, welding by the laser method, or MIG method was applied to the central part (an overlapped joint in a single layer) of portions of both the sheets, overlapped as above, in whole regions in the widthwise direction of both the sheets. With the laser method, a continuous wave YAG laser as defocused was adopted under conditions of an output at 2 to 4 kW, and weld velocity in a range of 0.8 to 2.0 m/min, using Ar as a shield gas. With the MIG method, conditions of an AC welding current in a range of 30 to 80 A, a welding voltage in a range of 7 to 18V, and a weld velocity in a range of 15 to 60 cm/min were adopted.

(Flux Cored Wire)

In common with Tables 1, and 2, use was made of an aluminum alloy filler metal (Si: 12.0 mass %, Mn: 0.1 mass %) corresponding to A4047, as an envelope and only the composition of the flux was variously changed. Further, if a weight of the flux in the flux cored wire corresponds to not more than 1 mass % against the total weight of a flux cored wire, metal powers were added thereto. The metal powers were aluminum alloy powders (grain size: 150 μm) of composition corresponding to A4047 as with the case of the envelope, and addition was made of the metal powers corresponding to 20 mass % against the total weight of the flux cored wire.

In common with Tables 1 to 3, respective fluxes of types (compositions) shown as below were prepared by melting and pulverizing to be subsequently processed into the shape of a flux cored wire 1.2 mm φ in wire diameter by the method previously described. Further, in common with Tables 1 to 3, numerical values of flux composition indicate mixed mol ratios (100 for total) of respective flux constituents (the flux constituents not indicating numerical values each represent a mol ratio at 100). Further, in common with Tables 1 to 3, the respective fluxes except for the case of (2) including $Na_2O$, $P_2O_5$, shown as below, did not chloride contain oxide, and did not effectively contain chloride either, chloride content thereof being less than 0.1 mol % against a total flux weight.

(Flux Types)
(1) 20CaF–80 KF
(2) $10AlF_3$–45LiF–$30Na_2O$–$15P_2O_5$
(3) $K_3AlF_6$($25AlF_3$+75KF)
(4) $K_2AlF_6$($33AlF_3$+67KF)
(5) $75AlF_3$–25KF
(6) $40AlF_3$–60KF (Method for Evaluation on the External Appearance of a Bead)

In common with Tables 1 to 3, visual observation was made on the external appearance of a bead, including a quantity of spatters generated during welding, thereby making evaluations in 4 stages. The evaluations in the 4 stages were carried out, by designating the most superior external appearance of the bead (in a sensory test for evaluation) as 4 while designating the most inferior external appearance as 1.

(Joint Strength)

In common with Tables 1 to 3, as for joint strength as the bonding strength of an aggregate of the dissimilar materials joined, a joint test piece 30 mm in width, including the joint, was cut off from a bonded joint, thereby having taken measurements on breaking strength per unit weld line. If the breaking strength is not less than 250N/mm, it is represented by symbol ◉, if the breaking strength is in a range of 200 to 250N/mm, it is represented by symbol ○, if the breaking strength is in a range of 100 to 200N/mm, it is represented by symbol Δ, and if the breaking strength is less than 100N/mm, it is represented by symbol X. Herein, unless the breaking strength is not less than 200N/mm (○), the aggregate of the dissimilar materials joined cannot be used as the structural member for the automobile, and so forth.

(Elongation of the Joint)

In Table 3, elongation (%) of the joint as the bonding strength of the aggregate of the dissimilar materials joined was measured. The elongation per unit weld line was measured also by cutting off a joint test piece 30 mm in width, including the joint, from the bonded joint. If the elongation is not less than 10%, it is represented by symbol ○○○ (triple circles, if the elongation is in a range of 7.5 to 10%, it is represented by symbol ◎ (double circle), if the elongation is in a range of 5.0 to 7.5%, it is represented by symbol ○, if the elongation is in a range of 2.5 to 5.0%, it is represented by symbol Δ, and if the elongation is less than 2.5%, it is represented by symbol X. Herein, unless the elongation is not less than 5.0% (○), the aggregate of the dissimilar materials joined cannot be used as the structural member for the automobile, and so forth.

(Respective Results of Tables 1, and 2)

As is evident from Tables 1, and 2, respectively, an aggregate of the dissimilar materials joined, according to each of the working examples 1 to 30, has the $AlF_3$ content as well as the loading weight of the fluoride-based flux in the envelope of the aluminum alloy, falling in the range of the conditions according to the invention, so that the aggregate of the dissimilar materials joined has excellent external appearance of the bead, and joint strength.

In contrast, since an aggregate of the dissimilar materials joined, according to each of the comparative examples 31 to 42, has the $AlF_3$ content as well as the loading weight of the fluoride-based flux in the envelope of the aluminum alloy, either insufficient or excessive, so as to fall outside the range of the conditions according to the invention, the aggregate of the dissimilar materials joined was found inferior to each of the working examples described as above in respect of the external appearance of the bead, and the joint strength.

(Results of Table 3)

As is evident from Table 3, an aggregate of the dissimilar materials joined, according to each of the working examples 43 to 64, has not only the Mn content as well as the Si content of the envelope of the aluminum alloy but also the $AlF_3$ content as well as the loading weight of the fluoride-based flux in the envelope of the aluminum alloy, falling in the range according to the invention, so that the aggregate of the dissimilar materials joined was found to have excellent external appearance of the bead, joint strength, and elongation.

In contrast, an aggregate of the dissimilar materials joined, according to each of the comparative examples 65 to 70, has the Mn content as well as the Si content of the envelope of the aluminum alloy, either insufficient or excessive, so as to fall outside the range of the conditions according to the invention, so that the aggregate of the dissimilar materials joined was found inferior to each of the working examples described as above in respect of the external appearance of the bead, joint strength, and elongation although the same has the $AlF_3$ content as well as the loading weight of the fluoride-based flux in the envelope of the aluminum alloy, regardless of falling within the range according to the invention.

On the basis of results of the tests on the working examples, described as above, there is demonstrated critical significance of respective requirements of the flux cored wire for joining dissimilar materials with each other, according to the invention, excellent in welding efficiency and for enhancing the bonding strength, in particular, in the case of joining high-strength dissimilar materials with each other, such as a high-strength steel member with a 6000 series aluminum alloy member, by melt weld-bonding.

With another embodiment of the invention, an AC-MIG welding is adopted as welding means. For the AC-MIG welding, use can be made of an AC-MIG welder for general use. Because the AC-MIG welder is capable of controlling heat input to members to be joined together with precision, it is possible to control an input heat value in order to execute melt-mixing of aluminum of an aluminum based material, and steel of an iron based material, and to check reactions thereof. By so doing, generation of a brittle intermetallic compound can be prevented at a joint, thereby preventing deficiency in strength (occurrence of cracking, in particular) at the joint. Besides the AC-MIG welding, laser welding is also applicable as the welding means capable of accurately controlling the input heat value.

For a welding wire (filler metal), use is made of a wire with a flux incorporated therein (a flux cored wire) formed by coating the flux with aluminum, or an aluminum alloy. As for a diameter of the wire in use, the wire not more than 1.6 mm in diameter is preferably used because of the necessity of generating a stable arc under a low current condition in order to reduce the input heat value as much as possible. If the diameter of the wire exceeds 1.6 mm, current for obtaining the stable arc becomes excessively large, so that melting of a base metal tends to become excessive, there by posing the risk of generating a brittle intermetallic compound (Fe—Al base compound).

For the flux of the welding wire, use is made of a flux containing aluminum fluoride, and potassium fluoride, together with at least one fluoride selected from the group consisting of magnesium fluoride, calcium fluoride, strontium fluoride, and barium fluoride.

In the past, use has been made of the fluoride-based mixed flux containing aluminum fluoride and potassium fluoride, having a function of melting and removing a sturdy oxide film on the surface of an aluminum base material. However, since the melting point of the mixed flux containing aluminum fluoride and potassium fluoride is very low, that is, lower than the melting point (660° C.) of aluminum, a large quantity of the flux undergoes evaporation, thereby causing deterioration in workability such as evolution of fume, generation of spatters, and so forth. Further, weld metal composed of aluminum is excessively spread, thereby preventing formation of a sound bead, so that it is not possible to obtain a high bonding strength. Accordingly, for the flux of the welding wire according to the invention, use is made of a flux containing a flux obtained by adding at least one fluoride, or not less than two fluorides, selected from the group consisting of magnesium fluoride (melting point: 1248° C.), calcium fluoride (melting point: 1403° C.), strontium fluoride (melting point: about 1400° C.), and barium fluoride (melting point: 1353° C.), as high melting point compounds among fluorides of elements of the Group IIA of the Periodic Table, to the mixed flux containing aluminum fluoride and potassium fluoride. By addition of those high melting point fluorides, it is possible to raise the melting point of the flux to a temperature range of about 700 to 1000° C., so that excessive spread of the weld metal composed of aluminum, otherwise occurring at the outset of welding can be checked, a sound bead can be formed, and scattering as well as evaporation of the flux at the time of the welding can be checked, thereby enabling the evolution of fume, and the generation of spatters to be reduced. If total content of the high melting point fluorides is excessively high, the flux will have difficulty with melting, thereby failing to sufficiently exhibit effects of enhancement inwettability, and on the other hand, if the total content of the high melting point fluorides is excessively low, effects of rise in the melting point of the flux will be insufficient, and therefore, the total content of the high melting point fluorides preferably corresponds to 10 to 50% of a total mass of the flux.

There is no particular limitation to a steel-base material to which a method for joining dissimilar materials together, according to the invention, is applied provided that the steel-base material is material containing iron as the main constituent thereof such as a steel member, an iron based alloy, and so forth. However, in the case of using the steel member, a galvanized steel sheet is preferably used from the viewpoint of securing corrosion resistance thereof. Further, there is no particular limitation to the strength of the steel sheet. In the case of conventional welding of a galvanized steel sheet, an arc becomes unstable by the agency of zinc vapor as evolved, thereby causing problems of generation of spatters, and occurrence of porous defects such as pits, blowholes, and so forth, however, with the method for joining the dissimilar materials together, according to the invention, an action of cleaning the surface of the steel sheet by virtue of advantageous effects of the flux is effectively exhibited, and molten metal covers the surface of the steel sheet with excellent wettability, so that the zinc vapor as evolved will be less, and arc stability will be excellent. In consequence, even in the case of the welding of the galvanized steel sheet, there occurs few defects such as blowholes, and so forth, and excellence in dynamic properties such as fatigue strength, and so forth can be expected.

As for welding conditions of the AC-MIG welding in carrying out the invention, a welding current is preferably at not less than 20 A, more preferably at not less than 30 A, and is preferably at not more than 10 A, more preferably at not more than 80 A. A welding voltage is preferably at not less than 5V, more preferably at not less than 7V, and is preferably at not more than 20V, more preferably at not more than 18V.

A welding speed may be decided as appropriate within a range where excessive melting of Al as well as Fe in the base metal can be prevented, according to the welding current, and the welding voltage, described as above, however, taking into consideration welding efficiency, and so forth, the welding speed is preferably not less than 15 cm/min, more preferably not less than 20 cm/min, and is preferably not more than 60 cm/min, more preferably more than 50 cm/min.

With the invention, a steel-base material can be joined directly with an aluminum-base material by the AC-MIG welding. Accordingly, with the AC-MIG welding, it is possible to expand an applicable range thereof, and to enhance flexibility thereof while enabling continuous joining to be implemented, without particular constraints imposed thereon, provided that proper welding current, voltage condition, joint shape, and so forth are adopted. Furthermore, both the steel-base material and the aluminum-base material each can be in a sound boned state with respective melt weights thereof, kept at a necessary minimum, and a brittle intermetallic compound is not prone to be formed at an interface between the steel-base material, and the aluminum-base material, thereby obtaining a high bonding strength.

[Working Examples]

There are described hereinafter working examples according to an embodiment of the invention. The method for joining dissimilar materials together, according to an embodiment of the invention, was adopted, and there were conducted tests on a lap fillet welding of an aluminum alloy sheet with an alloying zinc hot-dip galvanized (GA) steel sheet.

As shown in FIG. 1, an aluminum alloy sheet 1.6 mm thick is overlaid on a GA steel sheet 1.2 mm thick to thereby form an overlapped fillet joint, and the AC-MIG welding of the aluminum alloy sheet with the GA steel sheet was carried out by use of various flux cored wires. For a shield gas, use was made of argon. Respective test pieces of both the aluminum alloy sheet, and the GA steel sheet were each 100 mm×300 mm in planar size, and a flux cored wire 1.2 mm in diameter was used.

For a flux of the flux cored wire, use was made of NOKOLOCK (registered trademark) flux that is the mixed flux containing aluminum fluoride, and potassium fluoride, as a comparative example, while for working examples, use was made of a flux obtained by adding either one fluoride or two fluorides, selected from the group consisting of magnesium fluoride ($MgF_2$), calcium fluoride ($CaF_2$,) strontium fluoride ($SrF_2$), and barium fluoride ($BaF_2$), in total amount corresponding to 10 to 15% of the total mass of the flux, to the NOKOLOCK (registered trademark) flux.

Welding conditions were the same as the welding conditions of the AC-MIG welding, as previously recommended, that is, the welding current: in a range of 30 to 80 A, the welding voltage: in a range of 7 to 18V, and the welding speed: in a range of 15 to 60 cm/min.

Bonded joints as obtained were examined, and evaluations were made on stability of a bead, and joint strength. The stability of the bead was evaluated by observation of a shape of the bead of each of the bonded joints as obtained, rating the case of the bead being discontinuous as defective (X), and the case of the bead being continuous with a substantially constant width as good (○) (refer to FIG. 2). Further, the evaluation on the joint strength was made by sampling a joint-strength-evaluation test piece 30 mm in sheet width from the respective bonded joints to conduct a tensile test at velocity of 25 mm/min, thereby using shear tensile strength worked out by the following expression (1).

$$\text{joint strength} = (\text{load at a maximum load point})/(\text{sectional area of a joint}) \quad (1)$$

where "sectional area of a joint" is a sectional area an aluminum alloy sheet, in the thickness-wise direction thereof.

TABLE 4

| | | Evaluation | |
|---|---|---|---|
| No. | Fluorides of elements of the group IIA* | Shear tensile strength ($N/mm^2$) | Bead stability |
| 1 | $CaF_2$ | 254 | ○ |
| 2 | $CaF_2$, $MgF_2$ | 205 | ○ |
| 3 | none | 81 | X |
| 4 | none | 53 | X |
| 5 | $SrF_2$ | 192 | ○ |
| 6 | $BaF_2$ | 155 | ○ |
| 7 | $CaF_2$, $BaF_2$ | 228 | ○ |
| 8 | $MgF_2$ | 242 | ○ |
| 9 | $SrF_2$, $CaF_2$ | 173 | ○ |

*The fluoride constituents other than the fluorides of the elements of the Group IIA of the Periodic Table are KF, and $AlF_3$
*The fluoride constituents other than the fluorides of the elements of the Group IIA of the Periodic Table are KF, and $AlF_3$ The results of evaluation tests are shown in Table 4. In the cases of employing the flux cored wires according to the invention (working examples), wherein use was made of the flux containing the high melting point compounds among the fluorides of the elements of the Group IIA of the Periodic Table in addition to potassium fluoride and aluminum fluoride, it was found out that welding workability was excellent with reduction in evolution of fume, and generation of spatters, bead stability was excellent, and sound beads with few blowholes were obtained, as compared with the cases of employing conventional flux cored wires not containing the high melting point compounds (comparative examples), so that it was possible to obtain a high bonding strength in the respective cases.

(MIG Welding)

According to still another embodiment of the invention, the AC-MIG welding, or the MIG welding by DC reversed polarity, relatively low in working current, as a welding method employed in joining dissimilar materials together, among the arc welding, is selected, and the dissimilar materials are joined together by use of each of those welding, singly, or by use of combination thereof. By so doing, scattering of the fluoride-based mixed flux itself is prevented, thereby improving welding workability.

With the AC-MIG welding, it is possible to control the heat input to the members to be joined together with precision by appropriate combination of reversed polarity and positive polarity, so that the input heat value can be controlled so as to execute melt-mixing of aluminum of the aluminum based material, and steel of the iron based material, and to check the reactions thereof. As a result, generation of the brittle intermetallic compound at the joint can be prevented, thereby preventing deficiency in strength (occurrence of cracking, in particular) at the joint. For the AC-MIG welding, use can be made of the most common spray MIG welding method. Needless to say, besides this method, use may be made of the short-circuiting MIG welding method whereby molten metal at the tip of an electrode wire moves only at the time of short circuit, and the pulse MIG welding method whereby a stable pulse arc is obtainable by instantaneously imparting a pulse peak current higher than the critical current even if an average welding current is lower than the critical current.

The MIG welding by the DC reversed polarity, capable of stabilizing an arc with ease, is effective in the case of the need for ensuring bead stability, particularly in the case of, for example, bimetallic joining of a hot-dip galvanized steel sheet. In the case of the bimetallic joining of the hot-dip galvanized steel sheet, occurrence of blowholes in a molten metal zone, due to destabilization of an arc, will pose a problem in particular. If the MIG welding by the DC reversed polarity is adopted to cope with this problem, the arc will be stabilized, rendering it easier to obtain a stable bead. However, in the case of the AC-MIG welding, since the heat input to the members to be joined together can be controlled with precision by appropriately combining the reversed polarity with the positive polarity, as described in the foregoing, the input heat value can be controlled, so that the AC-MIG welding has the advantage of checking generation of brittle intermetallic compounds. In contrast, in the case of the MIG welding by DC reversed polarity, there is a possibility that an input heat value is prone to increase even under the same current condition as that for the AC-MIG welding, resulting in an increase in generation of brittle intermetallic compounds. For this reason, in the case of the MIG welding by DC reversed polarity, it is necessary to execute welding by increasing a welding speed as much as possible, thereby reducing the input heat value.

With other melt welding methods other than the respective MIG welding described as above, such as the TIG welding method, various melt welding methods using plasma, electron beam, high-frequency wave, and so forth, a working welding current is excessively high, and an input heat value is excessively high as compared with the respective MIG welding described as above. Accordingly, the fluoride-based mixed flux itself becomes prone to scatter during welding, thereby impairing welding workability. Further, it will be more difficult to check generation of the brittle intermetallic compound at the joint as compared with the respective MIG welding described. Furthermore, the spot welding, and so forth are unsuitable for line welding, such as fillet welding, butt welding, and so forth, required of bimetallic joining for the structural members of the automobile, as the object of the invention.

(Wire with a Flux Incorporated Therein)

Figure 3:
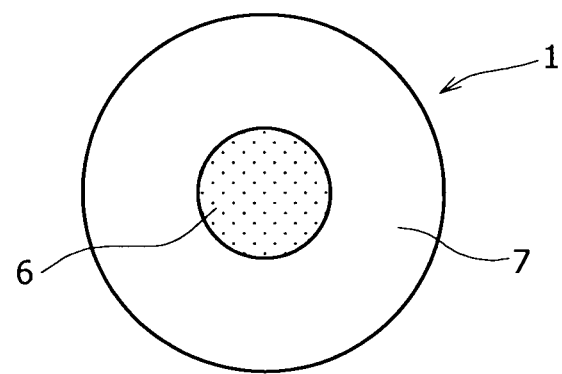
FIG. 3 is a cross-sectional view of a flux cored wire according to one embodiment of the invention.

With the invention, for a welding wire (filler metal), use is made of a wire with a flux incorporated therein, formed by coating a mixed flux containing potassium fluoride, and aluminum fluoride, described in the present description later on, with an aluminum alloy. FIG. 3 shows a cross-section of the wire 1 with the flux incorporated therein, for use in the invention. For the wire 1 with the flux incorporated therein, for use in the invention, use can be made of a common wire formed by filling up the interior of a tubular envelope 7 (also called a hoop) of an aluminum material with a flux 6. The wire with the flux incorporated therein is also referred to as a flux cored wire (FCW).

The flux cored wire includes a seamed type having a seam (line of juncture: crevice, opening), and a seamless type without a seam, fabricated by sealing the seam by welding, and so forth. With the invention, any of those types may be used. However, because the seamless type is higher in fabrication cost, the flux cored wire having a seam, for general use, is preferable. There is no particular limitation to the aluminum alloy to be used in the envelope of the flux cored wire, use can be made of 4000 series aluminum alloy including A4043, A4047, and so forth, and 5000 series aluminum alloy including A5356, A5183, and so forth. Besides, use may be made of aluminum alloy including 3000 series, 6000 series, and so forth.

The flux cored wire (FCW) having the seam can be manufactured by a common manufacturing method. More specifically, the manufacturing method comprises the steps of forming an aluminum alloy sheet or band into a shape resembling the letter U, filling up a formed sheet or band in the shape resembling the letter U with a flux, forming a U-shaped sheet or band into a tubular wire, and so forth. After a formed wire tubular in shape, with the flux filled therein, is manufactured, as above, and the common manufacturing method further comprises the step of drawing the formed wire tubular in shape to a product FCW (flux cored wire) of a fine diameter in a range of 0.8 to 2.4 mm $\Phi$.

(Wire Diameter)

With the invention, however, it is preferable to render the diameter of the flux cored wire finer than that in the case of the common manufacturing method, or to use the flux cored wire finer in diameter. By so doing, the input heat value is lowered, and a lower current condition is created upon carrying out the AC-MIG welding, and the MIG welding by the DC reversed polarity. As a result, the scattering of the fluoride-based mixed flux itself can be prevented, and the welding workability can be improved. Furthermore, formation of the brittle intermetallic compounds can be checked. For this reason, use is preferably made of the flux cored wire not more than 1.6 mm $\Phi$ in diameter. If the diameter of the wire exceeds 1.6 mm $\Phi$, current for obtaining a stable arc will become excessively large, causing the scattering of the fluoride-based mixed flux itself to increase. Further, melting of the base metal tends to be on an excessive side, thereby leading to the formation of the brittle intermetallic compounds (Fe—Al base compounds). The diameter of the flux cored wire is more preferably not more than 1.4 mm.

Thus, with the invention, use is made of the flux cored wire formed by filling up the interior of the envelope of the aluminum material with the flux instead of coating the weld zone directly with the fluoride-based mixed flux as with the case of the conventional technology previously described. By so doing, the scattering of the fluoride-based mixed flux itself is prevented, thereby improving the welding workability. Furthermore, the formation of the brittle intermetallic compounds is checked.

(Flux Composition)

With the invention, the composition of the flux used (filled up) in the flux cored wire is that of the mixed flux {referred to also as the NOKOLOCK (registered trademark) flux} of a specified composition, mixed with two-fluoride based fluxes, comprising aluminum fluoride, and potassium fluoride, in particular, among fluoride-based fluxes.

With the use of the mixed flux of the specified composition, it becomes possible to implement bimetallic joining of a steel member coated with hot-dipped zinc (including alloying zinc) plating, and an aluminum member. That is, respective surfaces of the galvanized steel member, and the aluminum member can be cleaned up, and the wettability of weld metal is improved. As a result, bead formation becomes excellent. Furthermore, an Fe—Al intermetallic compound layer formed at a joint of dissimilar materials, and formation of a brittle Zn—Fe based intermetallic compound layer attributable to zing plating can be checked. In consequence, a bonding strength is enhanced. Needless to say, such advantageous effects are exhibited even in the case of bimetallic joining of a bare steel member without zinc plating, and an aluminum member.

If the AC-MIG welding, and the MIG welding by the DC reversed polarity, according to the invention, are carried out under suitable conditions described hereunder by use of the flux cored wire of the composition according to the invention, this will make it possible to obtain a suitable thickness of the interfacial reaction layer (IMC: intermetallic compound), thereby improving the joint strength. In contrast, if a common arc welding is applied to bimetallic joining, an intermetallic compound in excess of 20 μm in thickness will occur to a weld-interface, bringing about deterioration in the joint strength. On the other hand, if the respective MIG welding methods described as above are carried out under suitable conditions described hereunder by use of the flux cored wire of the composition according to the invention, the interfacial reaction layer will be formed to a suitable thickness not more than 10 μm, so that the joint strength will be significantly improved. Further, even if the respective MIG welding methods described as above are carried out under suitable conditions described hereunder by use of a solid wire made of an aluminum alloy instead of the flux cored wire of the composition according to the invention, an intermetallic compound in excess of 20 μm in thickness occurs to the weld-interface, bringing about deterioration in the joint strength. Thus, the flux of the composition according to the invention, or the flux cored wire of the composition according to the invention has a large effect of checking generation of the intermetallic compound although detained mechanism thereof is still unknown.

Other fluoride-based mixed fluxes include, for example, cesium fluoride, zinc fluoride, and so forth, for use in the case of the conventional technology previously described as well. Even those other fluoride-based mixed fluxes each have a function of cleaning up a material surface to an extent. However, in the case of those other fluoride-based mixed fluxes, cesium fluoride, zinc fluoride, and so forth are extremely high in hygroscopicity. Accordingly, there is concern about possibility of deterioration in corrosion resistance of a weld metal zone besides a tendency of moisture absorbed causing blowholes to be prone to occur to the weld metal. Furthermore, in the bimetallic joining of the steel member coated with hot-dipped zinc plating, and the aluminum member, advantageous effects of cleaning up the material surface, and enhancing the wettability of the weld metal will become less.

The melting point of the mixed flux {NOKOLOCK (registered trademark) flux} is preferably adjusted to a melting point falling in a range of 560 to 700° C. in order that the respective effects described in the foregoing can be exhibited although dependent on the welding conditions by the AC-MIG welding, and the MIG welding by DC reversed polarity, for the bimetallic joining including the hot-dip galvanized steel member.

The melting point of the mixed flux can be appropriately adjusted by respective mixed amounts (a mixing ratio) of aluminum fluoride ($AlF_3$) powders, and potassium fluoride (KF) powders, and is adjusted according to the welding conditions by the AC-MIG welding, and the MIG welding byDC reversed polarity, for the bimetallic joining including the hot-dip galvanized steel member. In this respect, a ratio of aluminum fluoride on the order of 60 mol % is decided as the upper limit on the basis of eutectic composition of potassium fluoride and potassium fluoride (KF: 55 mol %, $AlF_3$: 45 mol %). Then, a remaining ratio (the remainder) is assigned to potassium fluoride, and both the fluorides are mixed with each other, whereupon the melting point of the mixed flux is adjusted so as to fall in a melting point range of 560 to 700° C.

If the flux melts in this melting point range (temperature region), wettability is improved at the outset of welding, so that molten aluminum neatly enters overlapped portions of the steel member and the aluminum member, thereby exhibiting a glue-like effect, and improving a bonding strength. Such an effect as described will be found pronounced particularly with the hot-dip galvanized steel member. If the melting point of the mixed flux is below 560° C., this effect will be less. On the other hand, if the melting point of the mixed flux exceeds 700° C., weld metal at the outset of the welding will spread less, so that influx to the overlapped portions of a joint will become insufficient.

(Flux Filling Factor)

Herein, however, a filling factor of the NOKOLOCK (registered trademark) flux into the flux cored wire becomes important. With the invention, the loading weight of the NOKOLOCK (registered trademark) flux (the mixed flux) is set relatively small to fall in a range of 0.1 to 24 mass %, against the total mass of the flux cored wire.

With a commercially available conventional flux cored wire for general use, a flux filling factor is large in excess of 24 mass %. Accordingly, even under common welding conditions by the AC-MIG welding, and the MIG welding by DC reversed polarity, not only molten flux in large quantity scatters but also the effects of enhancement in the wettability are excessive, so that a sound bead cannot be formed. Furthermore, because welding workability is poor, and the sound bead cannot be formed, reliability of the weld zone is impaired.

Accordingly, with the invention, the upper limit of the filling factor of the NOKOLOCK (registered trademark) flux into the flux cored wire is set to a level lower than that for the case of the commercially available conventional flux cored wire for general use, that is, less than 24 mass %. If the filling factor of the flux is 24 mass %, or higher, the filling factor of the flux is excessively high, so that scattering of the molten flux becomes excessive, and the bead is excessively spread, thereby preventing the sound bead from being formed, as described in the foregoing.

On the other hand, the lower limit of the filling factor of the NOKOLOCK (registered trademark) flux is set to 0.1%. If the filling factor of the NOKOLOCK (registered trademark) flux is too low, the filling factor becomes the same as that of an aluminum welding wire (JIS specification: A4043-WY, A4047-WY, A5356-WY, A5183-WY, and so forth) for forming a bead for general use in the arc welding. For this reason, if the filling factor of the NOKOLOCK (registered trademark) flux is less than 0.1%, advantageous effects of the NOKOLOCK (registered trademark) flux, such as the effects of enhancement in the wettability, and so forth, cannot be exhibited, so that it is not possible to obtain a sound and highly reliable welded joint.

Thus, the method for joining the dissimilar materials together, according to the invention, has fewer constraints in application conditions, and so forth, and is excellent in general versatility while being under fewer constraints in geometries upon joining an aluminum member with a steel member including the hot-dip galvanized steel member. Further, the invention can provides a joining technology whereby continuous joining necessary at the time of the line welding is enabled, generation of the brittle intermetallic compound at the joint, occurrence of blowholes in the weld zone, and deterioration in corrosion resistance are reduced, and welding workability is rendered excellent. Accordingly, it becomes possible to provide a bonded joint of dissimilar materials (welded joint of dissimilar materials) applicable to structural members of the automobile, and so forth.

(MIG Welding Application)

Next, there is described hereinafter an application mode of the AC-MIG welding, and the MIG welding by DC reversed polarity, according to the method of the invention, for joining the dissimilar materials together, however, the application mode of the MIG welding is identical to a common method. FIG. 1 shows one mode of the application. In FIG. 1, an end 2a of an aluminum member 2 is overlaid on an end 3a of a hot-dip galvanized steel member (or a bare steel member) 3 to thereby form an overlapped joint for joining the respective ends 3a, 2a with each other.

Thereafter, a welding torch 10, and the flux cored wire 1 according the invention are used, and the welding torch 10 is moved along a weld line 5 extending along the respective ends 3a, 2a of the steel member 3, and the aluminum member 2 (in the back-and-forth direction in the figure), thereby applying the respective MIG welding methods described as above to the full length of the weld line 5. In this case, a tilt angle θ of the welding torch 10 is selected as appropriate. In FIG. 1, reference numeral 4 denotes a weld metal (bead) formed on the weld line 5.

In the case of the method for joining the dissimilar materials together, according to the invention, since the steel member can be directly joined with the aluminum member, the method will not be subjected to particular constraints provided that proper welding current, voltage condition, joint shape, and so forth are adopted, having advantageous effects of continuous joining being enabled, together with expansion in an applicable range, and enhancement in general versatility. Further, it is possible to obtain a sound boned state with a necessary minimum melt (diluted) weight of the steel member, in the weld metal such as the bead and so forth, as previously described, and even in the case of the hot-dip galvanized steel member, the brittle intermetallic compound is hard to be formed, so that a high bonding strength can be obtained.

(Welding Conditions)

There are described hereinafter preferred welding conditions in order to enhance the bonding strength of a weld zone (joint) upon welding application in the cases of the respective MIG welding methods described as above. As for welding conditions, welding is preferably applied such that a sound boned state can be obtained with a necessary minimum melt (diluted) weight of a base metal without causing excessive melt of the steel member, as the base metal, in order to check generation of the brittle intermetallic compound otherwise generated at an interface between the aluminum member, and the steel member.

(Welding Current)

Upon application of the AC-MIG welding, and the MIG welding by DC reversed polarity, the larger amperage of a welding current, the more prone to scatter is the flux, so that the brittle intermetallic compound generated on a bond-interface will increase. For this reason, it is recommendable to execute joining on a low current condition from the viewpoint of checking such scattering of the flux, and generation of the brittle intermetallic compound. The welding current as recommended is not less than 20 A, more preferably not less than 30 A, and not more than 100 A, more preferably, not more than 80 A.

(Welding Voltage)

As for a welding voltage, it is recommendable to execute joining on a low voltage condition in the cases of both the AC-MIG welding, and the MIG welding by DC reversed polarity, as with the case of the welding current. The welding voltage recommendable is not lower than 5V, more preferably not lower than 7V, and not higher than 20V, more preferably not higher than 18V.

(Welding Speed)

In the cases of both the AC-MIG welding, and the MIG welding by DC reversed polarity, a welding speed may be decided as appropriate within a range where Fe and Al in the base metal are not caused to undergo excessive melting, according to the welding current, and the welding voltage. Taking into consideration welding efficiency, and so forth, the welding speed in the case of the AC-MIG welding is preferably not less than 15 cm/min, more preferably not less than 20 cm/min, and is preferably not more than 60 cm/min, more preferably not more than 50 cm/min.

In contrast, in the case of the MIG welding by DC reversed polarity, there is the need for applying welding by increasing the welding speed as much as possible to thereby reduce the input heat value in order to check the generation of the brittle intermetallic compound as previously described. For this reason, the welding speed is preferably not less than 30 cm/min, more preferably not less than 50 cm/min, and is preferably not more than 200 cm/min, more preferably not more than 150 cm/min.

Shield Gas:

For the shield gas in the cases of both the AC-MIG welding, and the MIG welding by DC reversed polarity, a gas for general use, such as Ar, and so forth, can be used as appropriate, and a flow rate of the shield gas can be selected in a flow rate rage, for general use, for example, from 10 to 50 L/min, and there is no particular limitation thereto.

Welding Torch Angle:

There is no particular limitation to a welding torch (an arc torch) angle, and in the cases of both the AC-MIG welding, and the MIG welding by DC reversed polarity, and the angle θ is selected as appropriate according to the relevant welding, welding conditions of a joint, and so forth.

(Member as Application Object)

As members as application objects of the method for joining the dissimilar materials together, according to the invention, there are cited, for example, construction members to be joined with each other, such as automobile members, and large sized panels, made up of the hot-dip galvanized steel member, to be joined with reinforcing members made up of the aluminum alloy member, as previously described. In this connection, there can be cited, for example, bonding such as respective joints of a side member made up of a rectangular hollow section formed from the hot-dip galvanized steel sheet, and a bumper reinforcing member, or a bumper stay, made up of an aluminum alloy extruded hollow section, obtained by directly overlapping respective ends thereof, with each other, as shown in FIG. 1, or obtained by overlapping respective flange faces provided at the respective ends thereof.

(Steel Member)

From the viewpoint of ensuring corrosion resistance of the steel member, and the object of the invention as well, it is particularly desirable that a zinc (including alloying zinc) hot-dip galvanized steel member that has been difficult by nature for use in bimetallic joining can be used in the invention. In the case of welding of a galvanized steel member, including hot dip galvanizing, an arc becomes unstable by the agency of zinc vapor as evolved, thereby causing problems of generation of spatters, and occurrence of porous defects such as pits, blowholes, and so forth. However, with the method for joining the dissimilar materials together, according to the invention, an effect of cleaning up the surface of the steel sheet by virtue of an effect of the flux is exhibited, and molten metal covers the surface of the steel sheet with excellent wettability, so that the zinc vapor as evolved will be less. In particular, because cesium fluoride, high in hygroscopicity, is not contained in the flux cored wire according to the invention, the flux cored wire can be further check blowholes, and is excellent in arc stability.

The steel member (iron based material) itself used in the invention is a steel member such as mild steel, high tensile steel (Hi-Ten), and so forth. There is no particular limitation to type and shape of the steel member used in the invention, and use can be made of a steel member appropriate in shape and material type, such as a steel sheet, steel section, steel pipe, and so forth, for general use as a structural member, or diverted from application for the structural member. However, in order to obtain a high strength as the structural member, use of the high tensile steel (Hi-Ten) is preferable.

(Aluminum Member)

An aluminum member for use in the invention has no particular limitation to type and shape of an alloy thereof, and selection, as appropriate, is made of a rolled sheet member, shaped member such as an extrusion, forged member, cast member, and so forth, for general use according to properties required of respective structural members. However, in order to obtain a high strength as the structural member, use is preferably made of aluminum alloy of an Al—Mg base, Al—Mg—Si base, or Al—Mg—Zn base for general use as aluminum alloy capable of meeting requirements for various properties such as formability, and so forth, or aluminum alloy of 5000 series, 6000 series, 7000 series, according to JIS or AAA specification, and so forth. Selection as appropriate is made out of those aluminum alloys after tempering treatment is applied thereto according to strength required by the structural member, and formability.

[Working Examples]

TABLE 5

| | | | | Evaluation on a welded joint | | | |
|---|---|---|---|---|---|---|---|
| No. | Classification | Filling factor of flux of a flux cored wire Mass % | Shear tensile strength N/mm | Sectional shape of a bead, a ratio of a (width)/ b (height) | External appearance of a bead | Weight of the fume evolved | Remarks (Steel sheet in use) |
| 1 | Comparative example | 0 | Not bonded | — | — | — | GA steel sheet |
| 2 | Working example | 0.1 | 178 | ○ | ○ | ◎ | GA steel sheet |
| 3 | Working example | 10 | 256 | ○ | ○ | ○ | GA steel sheet |
| 4 | Working example | 24 | 225 | ○ | ○ | ○ | GA steel sheet |
| 5 | Comparative example | 50 | 51 | X | X | X | GA steel sheet |
| 6 | Working example | 10 | 165 | ○ | ○ | ○ | Bare steel sheet |
| 7 | Working example | 24 | 199 | ○ | ○ | ○ | Bare steel sheet |
| 8 | Comparative example | 10 | 43 | X | X | ○ | GA steel sheet |
| 9 | Comparative example | 10 | 37 | X | X | ○ | GA steel sheet |

TABLE 6

| | | | | Evaluation on a welded joint | | | |
|---|---|---|---|---|---|---|---|
| No. | Classification | Filling factor of flux of a flux cored wire Mass % | Shear tensile strength N/mm | Sectional shape of a bead, a ratio of a (width)/ b (height) | External appearance of a bead | Weight of the fume evolved | Remarks (Steel sheet in use) |
| 10 | Comparative example | 0 | Not bonded | — | — | — | GA steel sheet |
| 11 | Working example | 0.5 | 184 | ○ | ○ | ◎ | GA steel sheet |
| 12 | Working example | 13.5 | 262 | ○ | ○ | ○ | GA steel sheet |
| 13 | Comparative example | 63 | 43 | X | X | X | GA steel sheet |
| 14 | Working example | 14.5 | 249 | ○ | ○ | ○ | GI steel sheet |

TABLE 6-continued

| | | | | Evaluation on a welded joint | | | |
|---|---|---|---|---|---|---|---|
| No. | Classification | Filling factor of flux of a flux cored wire Mass % | Shear tensile strength N/mm | Sectional shape of a bead, a ratio of a (width)/b (height) | External appearance of a bead | Weight of the fume evolved | Remarks (Steel sheet in use) |
| 15 | Working example | 5 | 251 | ○ | ○ | ○ | GI steel sheet |
| 16 | Working example | 24 | 196 | ○ | ○ | ○ | GI steel sheet |
| 17 | Working example | 12 | 220 | ○ | ○ | ○ | Bare steel sheet |

Working examples according to another embodiment of the invention are described hereinafter. There were conducted tests on a Lap Fillet© welding of an aluminum alloy sheet with a steel sheet by use of the method for joining the dissimilar materials together, according to the invention. In this case, for the steel sheet, use was made of an alloying zinc hot-dip galvanized steel sheet (GA steel sheet), a hot-dip galvanized steel sheet (GI sheet), and a bare (without surface treatment) steel sheet. Results of the tests in the case of the AC-MIG welding are shown in Table 5.

Further, results of the tests in the case of the MIG welding by DC reversed polarity are shown in Table 6.

In the cases of both the AC-MIG welding, and the MIG welding by DC reversed polarity, the lap fillet welding of test pieces of the aluminum alloy sheet and the steel sheet, with each other, was executed in the mode previously shown in FIG. 1. More specifically, an end of an aluminum alloy sheet (JIS 5182 alloy) 1.6 mm in thickness was overlaid on an end of any of the alloying zinc hot-dip galvanized steel sheet (GA steel sheet), the hot-dip galvanized iron sheet (GI sheet), and the bare steel sheet (tensile strength of any of those sheets: 270 MPa), having thereby formed a lap fillet welded joint. The respective test pieces of the aluminum alloy sheet and the steel sheet was each 100 mm (width)× 300 mm (length) in planar size, and mutual allowance for overlapping was 35 mm (a weld line length: 100 mm corresponding to the sheet width).

As shown in Tables 5, 6, respectively, the MIG welding of the aluminum alloy sheet with the galvanized steel sheet was conducted by use of a flux cored wire with a mixed flux composed of $AlF_3$ and KF, the filling factor of the flux being variously changed. In this case, a mixing ratio of KF to $AlF_3$, in the flux, was kept constant for both the working examples and the comparative examples such that the melting point of the flux remained constant at 650° C., using the flux composed of a mixture of KF: 45 mol %, and $AlF_3$: 55 mol %. In common with Tables 5, 6, use was made of the flux cored wire 1.2 mm φ in diameter. For an aluminum envelope of the flux cored wire, use was made of the A4043 type, and in the step of the drawing described previously, the flux cored wire was formed to the final diameter at 1.2 mm φ as above.

Further, for the sake of comparison, the AC-MIG welding was applied under the same condition as in the case of the working examples to respective examples where use was made of a flux cored wire obtained by substituting cesium fluoride, and zinc fluoride, used in the past, for part of KF, a flux containing 10 mol % each of cesium fluoride, and zinc fluoride, together with a mixture of KF: 45 mol %, and $AlF_3$: 55 mol %. Those are shown as comparative examples 8, 9 in Table 5. The filling factor of the flux of each of the comparative examples 8, 9 was 10 mass %, the same as that for the working examples. Further, the comparative examples 8, 9 each had a melting point around 500° C.

In the cases of both the AC-MIG welding, and the MIG welding byDC reversed polarity, welding conditions were applied within the range of the MIG welding conditions, as previously recommended. The welding speed in the case of the AC-MIG welding: 35 cm/min, and in the case of the MIG welding by DC reversed polarity, the welding speed was increased to 80 cm/min in order to check the generation of the brittle intermetallic compound as previously described. Further, in the cases of both the AC-MIG welding, and the MIG welding by DC reversed polarity, the welding current: 75 A, the welding voltage: 18V, and welding torch angle: 90° were adopted, and for the shield gas, use was made of argon.

The welding under the conditions described as above were applied to the respective examples three times, a test piece was sampled from respective bonded joints, and various tests were conducted on the respective test pieces, whereupon respective test results were averaged out to be used for evaluations. First, as to shear tensile strength, a joint-strength-evaluation test piece 30 mm in sheet width was sampled from the respective joints bonded three times, and a tensile test at velocity of 25 mm/min was conducted on the respective test pieces, thereby having found an average value of the shear tensile strength for the respective examples.

Figure 4:
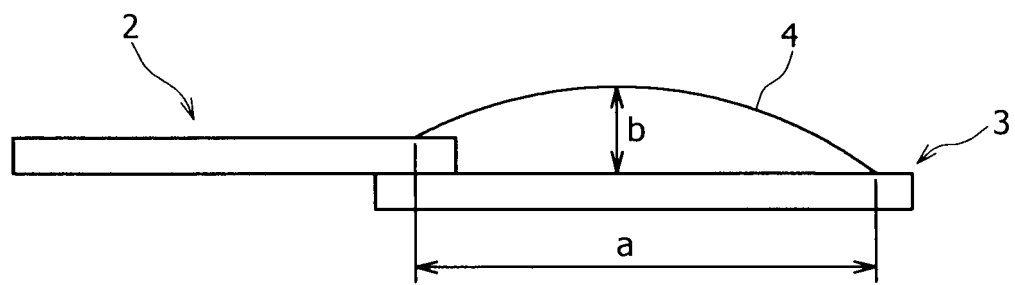
FIG. 4 is sectional view schematically showing one mode of evaluation on wettability of the weld beads upon joining of the dissimilar materials.

Further, in order to examine a spread effect of the flux, wettability of the respective bonded joints were examined. For evaluation on the wettability, a spread width (a) of the weld metal 4, and a height (b) of the weld metal 4 were measured at appropriate intervals along the weld line, respectively, as shown in FIG. 4 corresponding to FIG. 1, in schematic form. Thereafter, a ratio of "a" to "b", a/b, was averaged out along the weld line, and with the respective samples, the average a/b for each of 3 test pieces (as obtained from 3 welding tests) was further averaged out. On the basis of an evaluation criteria for the wettability, it was determined that a/b on the average in a range less than 0.6 represents the case of the spread width of the weld metal being adequate, being marked symbol ○, while a/b on the average at not less than 0.6 is marked symbol X (indicating failure to form a sound bead due excessive spread of the weld metal).

As for the welding workability, evaluation was made on weight of fume evolved during welding, and bead stability. The weight of the fume evolved was measured according to JIS-Z3930. More specifically, total fume evolved at the time of the welding using the respective flux cored wires was collected to thereby find the weight of the fume evolved per unit time. With the respective example, the weights of the fume evolved, obtained from the three welding tests, respectively, were averaged out. If the weight of the fume evolved, on average, was less than 300 mg/min, it was rated ⊚, if the same is in a range of 300 to 700 mg/min, it was rated ○, and if the same is not less than 700 mg/min, it was rated X.

Figure 2A:
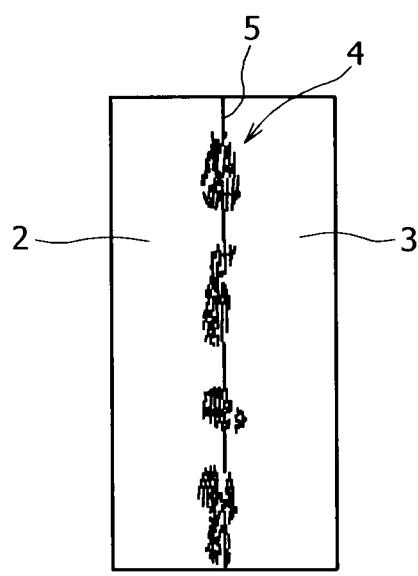
FIG. 2 is a plan view schematically showing a mode of evaluation on the external appearance of weld beads upon joining of the dissimilar materials for use in explanation about a criteria for determining acceptability of a bead shape at a bonded joint.
Figure 2B:
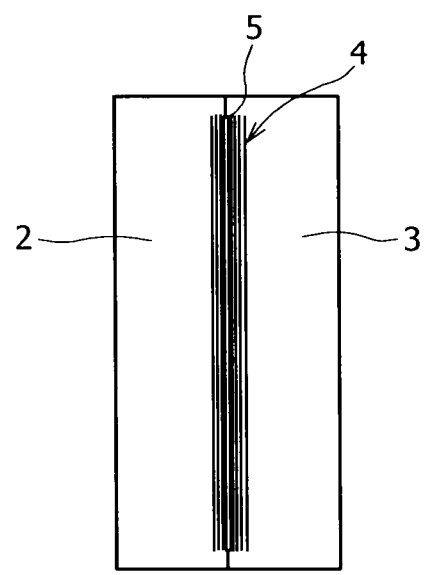

Further, the bead stability was evaluated according to the criteria based on a bead shape formed, as shown in FIG. 2. The case where a bead was linearly, and neatly formed as shown in FIG. 2(b) with all the three welding tests was rated ○ while the case where a bead was formed only discontinuously even during only one of the welding tests was rated X. Those results are shown in Tables 5 and 6, respectively.

First, as is evident from Table 5, with each of the working examples 2 to 4, wherein the flux of the flux cored wire, and the flux factor were within the respective ranges according to the invention, and the AC-MIG welding conditions are in the preferable range, it was found that the wettability of the weld metal was adequate in spite of bimetallic joining of the alloying zinc hot-dip galvanized steel sheet (GA steel sheet), an excellent bead was formed, and the bonding strength was improved. Furthermore, the weight of the fume evolved due to scattering of molten flux was found less and welding stability was found excellent. The same applies to the working examples 6, 7 using the bare steel sheet.

In contrast, with the comparative example 1 without flux filled therein, it was not possible to implement joining itself in the case of the bimetallic joining of the alloying zinc hot-dip galvanized steel sheet (GA steel sheet). Further, with the comparative example 5, wherein a flux cored wire had the same flux composition as that for the working examples, but its flux filling factor exceeded the upper limit of the range according to the invention, the flux filling factor was found excessively high. Accordingly, with the comparative example 5, it was found that the wettability of the weld metal was inadequate in the case of the bimetallic joining of the alloying zinc hot-dip galvanized steel sheet (GA steel sheet), bead formation was discontinuous, and the bonding strength was low although joining was implemented. Furthermore, the weight of fume evolved due to scattering of molten flux was large, and welding stability was inferior.

Meanwhile, with the comparative examples 8, 9, using cesium fluoride, and zinc fluoride, as in the past, a flux filling factor was the same as that for the working examples, so that the weight of fume evolved due to scattering of molten flux was found less, and welding stability was found excellent. However, the wettability of weld metal was found inadequate, and bead formation was found discontinuous. For this reason, even though joining was implemented in the bimetallic joining of the alloying zinc hot-dip galvanized steel sheet (GA steel sheet), bonding strength was found considerably poor as compared with the working examples. The reason for this is presumably because the flux using cesium fluoride, and zinc fluoride has an excessively low melting point, so that excessive wettability results, thereby causing excessive spread of the bead. In addition, since the flux using cesium fluoride, and zinc fluoride is high in hygroscopicity, the bead becomes unstable owing to the influence of moisture to be thereby rendered discontinuous, so that it is deemed that an excellent joint could not be formed.

Next, as is evident from Table 6, with each of the working examples 11, 12, 14 to 16, the flux of the flux cored wire, and the flux factor were within the respective ranges according to the invention, and the conditions of the MIG welding by DC reversed polarity are in the preferable range. As a result, with those working examples, it was found that the wettability of the weld metal was adequate in spite of the bimetallic joining of the alloying zinc hot-dip galvanized steel sheet (GA steel sheet), an excellent bead was formed, and the bonding strength was improved. Furthermore, the weight of the fume evolved due to scattering of molten flux was found less, and welding stability was found excellent. The same applies to the working example 17 using the bare steel sheet.

In contrast, with the comparative example 10 without flux filled therein, it was not possible to implement joining itself in the case of the bimetallic joining of the alloying zinc hot-dip galvanized steel sheet (GA steel sheet). Further, with the comparative example 13, wherein a flux cored wire had the same flux composition as that for the working examples, but its flux filling factor exceeded the upper limit of the range according to the invention. For this reason, it was found that the wettability of the weld metal was inadequate in the case of the bimetallic joining of the alloying zinc hot-dip galvanized steel sheet (GA steel sheet), bead formation was discontinuous, and the bonding strength was low although joining was implemented. Furthermore, the weight of fume evolved due to scattering of molten flux was large, and welding stability was inferior.

On the basis of those working examples, there is demonstrated critical significance of respective requirements of the invention, such as the flux composition of the flux cored wire, the flux filing factor, particularly, the bonding strength of the bimetallic joining of the galvanized steel member with the aluminum member, and workability.

INDUSTRIAL APPLICABILITY

The invention can provide a flux cored wire for joining dissimilar materials with each other, capable of enhancing a bonding strength in melt weld-bonding of high-strength dissimilar materials with each other, that is, the high-strength steel member with the high-strength 6000 series aluminum alloy member, and excellent in welding efficiency, and a method for joining the dissimilar materials with each other. Further, it is possible to obtain a bonded joint of dissimilar materials, such as a galvanized steel member and an aluminum member, without any constraint on shapes of base metals to be joined together, without causing generation of a brittle intermetallic compound at the bonded joint, excellent in external appearance, and without causing occurrence of defects such as blowholes, and so forth if joining is executed by the AC-MIG welding using the flux cored wire according to the invention, wherein a flux filling factor, and a melting point are properly controlled. Since the aggregate of the dissimilar materials joined, obtained as above, is superior in bonding strength, and welding efficiency, the aggregate can be quite usefully applied to various structural members of automobiles, railway vehicles, and so forth, in the transportation field, machine components, construction members such as building structures, and so forth. Hence the invention will greatly contribute to expansion of application for the aggregate of the dissimilar materials, for example, a steel member and an aluminum member, joined together, high in strength.

The invention claimed is:
1. A flux cored wire suitable for enhancing bonding strength in melt weld bonding, comprising an aluminum alloy envelope and a flux
   wherein the aluminum alloy envelope is filled up with the flux,
   wherein the flux comprises aluminum fluoride in a range of 0.4 to 15 mass % based on the total mass of the flux cored wire,
   wherein the flux contains no chloride,
   wherein the flux has a melting temperature in a range of 700° C. to 1000° C., and wherein an amount of the flux is in a range of 0.3 to 20 mass % based on the total mass of the flux cored wire.

2. The flux cored wire according to claim 1, wherein the aluminum alloy envelope comprises Si in a range of 1 to 13 mass %, the balance being composed of Al and unavoidable impurities.

3. The flux cored wire according to claim 1, wherein the aluminum alloy envelope further comprises Mn in a range of 0.1 to 0.3 mass %.

4. A material, comprising the flux cored wire according to claim 1, a steel member and an aluminum member, wherein the steel member and the aluminum member are joined by the flux cored wire, and wherein the steel member is a galvanized steel member.

5. The material according to claim 4, wherein the steel member is a high tensile steel member and the aluminum member is a 6000 series aluminum alloy member.

6. The flux cored wire according to claim 1, wherein the flux comprises one or more oxides.

7. The flux cored wire according to claim 1, where the flux comprises one or more of aluminum oxide, sodium oxide, lithium oxide and diphosphorous pentaoxide.

8. The flux cored wire according to claim 1, wherein the aluminum alloy envelope comprises an A4047 alloy.

9. The flux cored wire according to claim 1, wherein the aluminum alloy envelope comprises an A4043 alloy.

10. The flux cored wire according to claim 1, wherein the envelope is tubular.

11. The flux cored wire according to claim 1, wherein the flux comprises at least one additional fluoride selected from the group consisting of magnesium fluoride, calcium fluoride, strontium fluoride and barium fluoride.

12. The flux cored wire according to claim 11, wherein the flux comprises the additional fluoride in an amount of 10 to 50 mass % of the total mass of the flux.

13. The flux cored wire according to claim 1, wherein a diameter of the wire is not more than 1.6 mm.

14. A method for joining dissimilar materials together, comprising:
carrying out melt-welding the dissimilar materials comprising a high tensile steel member and a 6000 series aluminum alloy member, with each other, with the flux cored wire according to claim 1.

* * * * *